US012377946B1

(12) United States Patent
Todter

(10) Patent No.: US 12,377,946 B1
(45) Date of Patent: Aug. 5, 2025

(54) METHOD AND APPARATUS FOR SOLAR POWERED AND NAVIGATIONALLY OPTIMIZED HYDROFOIL AUTONOMOUS VESSEL

(71) Applicant: Christopher Todter, San Diego, CA (US)

(72) Inventor: Christopher Todter, San Diego, CA (US)

( * ) Notice: Subject to any disclaimer, the term of this patent is extended or adjusted under 35 U.S.C. 154(b) by 0 days.

(21) Appl. No.: 18/748,990

(22) Filed: Jun. 20, 2024

Related U.S. Application Data

(60) Provisional application No. 63/595,115, filed on Nov. 1, 2023, provisional application No. 63/581,852, filed on Sep. 11, 2023.

(51) Int. Cl.
*B63B 1/28* (2006.01)
*B63B 1/00* (2006.01)
(Continued)

(52) U.S. Cl.
CPC ............... *B63H 1/34* (2013.01); *B63B 1/24* (2013.01); *B63B 1/246* (2013.01); *B63B 1/30* (2013.01);
(Continued)

(58) Field of Classification Search
CPC ........................ B63B 1/20; B63B 1/28; B63B 2035/006–008; B63H 1/24; B63H 5/08; B63H 5/125
(Continued)

(56) References Cited

U.S. PATENT DOCUMENTS

| 3,897,744 A * | 8/1975 | Lang ...................... B63B 1/288 |
| | | 114/277 |
| 6,855,016 B1 * | 2/2005 | Jansen .................. B63H 21/17 |
| | | 440/27 |

(Continued)

FOREIGN PATENT DOCUMENTS

| BR | 112020004900 A2 * | 9/2020 | ............. B63B 1/246 |
| BR | PI0622106 B1 * | 1/2021 | ................ F01B 1/00 |

(Continued)

OTHER PUBLICATIONS

An English-translated version for CN 107084036 B by Hinderks M V (published on Oct. 22, 2019).*

(Continued)

*Primary Examiner* — Cuong H Nguyen
(74) *Attorney, Agent, or Firm* — Knobbe, Martens, Olson & Bear, LLP

(57) ABSTRACT

An unmanned ocean vehicle apparatus having a hull, solar array, hydrofoil, and electric thruster is operable on a surface of a body of water to travel from one point to another with long range capabilities. The unmanned ocean vehicle can further be placed in a more compact configuration, incorporating a mechanism to alternate between operational mode and collapsed storage mode to facilitate physical storage or shipment of the vehicle. Methods are described for optimizing travel and determining favorable movements of the unmanned ocean vehicle by calculating current and predicted conditions at certain waypoints using a combination of a sensor, a computer, and a control system. The physical support of hydrofoils, a drag reducing system, capsize-prevention technique, and a three-dimensional arrangement of solar panels provides efficient power management, optimal route strategy, and sustainability of the vehicle's high speeds in wildly varying ocean conditions.

20 Claims, 16 Drawing Sheets

(51) Int. Cl.
*B63B 1/24* (2020.01)
*B63B 1/30* (2006.01)
*B63B 79/40* (2020.01)
*B63H 1/34* (2006.01)
*B63H 21/17* (2006.01)
*B63H 25/42* (2006.01)
*G05D 1/48* (2024.01)

(52) U.S. Cl.
CPC ............ *B63B 79/40* (2020.01); *B63H 21/17* (2013.01); *B63H 25/42* (2013.01); *G05D 1/48* (2024.01); *B63H 2021/171* (2013.01)

(58) Field of Classification Search
USPC ........................................................ 440/6, 21
See application file for complete search history.

(56) References Cited

U.S. PATENT DOCUMENTS

| | | | | |
|---|---|---|---|---|
| 7,984,684 | B2 * | 7/2011 | Hinderks | F01L 1/06 114/274 |
| 2012/0227389 | A1 * | 9/2012 | Hinderks | F02B 75/002 60/317 |
| 2019/0107406 | A1 * | 4/2019 | Cox | G01S 19/42 |
| 2019/0308709 | A1 * | 10/2019 | Kramer | B63B 32/10 |
| 2023/0078347 | A1 * | 3/2023 | Sheldon-Coulson | C25B 15/023 205/637 |

FOREIGN PATENT DOCUMENTS

| | | | | | |
|---|---|---|---|---|---|
| CA | 2831921 | A1 | * | 10/2012 | ............ B63B 1/38 |
| CN | 204021244 | U | * | 12/2014 | ............ B64C 25/00 |
| CN | 109591966 | A | * | 4/2019 | ............ B63B 35/00 |
| CN | 209280363 | U | * | 8/2019 | ............ F01B 1/10 |
| CN | 107084036 | B | * | 10/2019 | ............ F01B 1/10 |
| CN | 111994248 | A | * | 11/2020 | ............ B63H 19/02 |
| CN | 213200100 | U | * | 5/2021 | |
| CN | 113548165 | A | * | 10/2021 | ............ B63B 1/30 |
| CN | 114013581 | A | * | 2/2022 | |
| CN | 115257265 | A | * | 11/2022 | |
| CN | 115709623 | B | * | 10/2023 | |
| CN | 117002706 | A | * | 11/2023 | |
| EP | 3647829 | A1 | * | 5/2020 | |
| JP | 2011518280 | A | * | 6/2011 | ............ F02F 1/00 |
| JP | 5596847 | B1 | * | 9/2014 | ............ B63B 35/00 |
| JP | 2015166595 | A | * | 9/2015 | ............ F01B 1/10 |
| JP | 6430885 | B2 | * | 11/2018 | ............ F01B 1/10 |
| JP | 2023023441 | A | * | 2/2023 | |
| KR | 20160093580 | A | * | 8/2016 | ............ F16J 12/00 |
| WO | WO-2023168323 | A2 | * | 9/2023 | |

OTHER PUBLICATIONS

An English-translated version for JP 2023023441A by Naoyuki (published on Feb. 16, 2023) (Year: 2023).*
An English-translated version for CA2831921A1 by G Sancoff (published on Oct. 4, 2012).*
An English-translated version for CN109591966A by Yu et al (published on Apr. 9, 2019).*
An English-translated version for CN213200100U by Lang Yan et al (published on Aug. 20, 2019) (Year: 2019).*
An English-translated version for CN111994248A by Liao & Cheng (published on Nov. 27, 2020) (Year: 2020).*
An English-translated version for EP3647829A1 by James Ives et al (published on May 6, 2020) (Year: 2020).*
An English-translated version for CN113548165A by Cheng Weixing et al (published on Oct. 26, 2021) (Year: 2021).*
Zeng, Shengqin, et al. "Technological Development of Hybrid Aquatic-Aerial Vehicle Based on Bionics: Research Progress and Trends." (Year: 2024).*
Wang, Jinfeng, et al. "Development of technology opportunity analysis based on technology landscape by extending technology elements with BERT and TRIZ." Technological Forecasting and Social Change 191 (2023): 122481; . (Year: 2023).*

* cited by examiner

METHOD AND APPARATUS FOR SOLAR POWERED AND NAVIGATIONALLY OPTIMIZED HYDROFOIL AUTONOMOUS VESSEL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. The present application claims priority to U.S. Provisional Patent Application No. 63/581,852, filed Sep. 11, 2023, titled METHOD AND APPARATUS FOR SOLAR POWERED AND NAVIGATIONALLY OPTIMIZED HYDROFOIL AUTONOMOUS VESSEL, and U.S. Provisional Patent Application No. 63/595,115, filed Nov. 1, 2023, titled METHOD AND APPARATUS FOR SOLAR POWERED AND NAVIGATIONALLY OPTIMIZED HYDROFOIL AUTONOMOUS VESSEL, the entire content of each of which is incorporated by reference herein for all purposes and forms a part of this specification.

BACKGROUND

Field

The present disclosure relates generally to the field of sea-going autonomous vessels, their navigation methods, and more particularly, to autonomous solar energy-powered hydrofoil vessels and their optimized navigation methods maximizing the vessels' available power and hydrofoil capabilities.

Description of the Related Art

Autonomous vessels or unmanned vessels are used in many applications including but not limited to commercial shipping, environmental and climate monitoring, seafloor mapping, explorative research, surveillance, robotics, infrastructure inspection, recreation, and military naval operations. However, navigating aquatic bodies with unmanned vehicles presents increased difficulties due to variables in factors such as technical limitations (e.g., power, battery), weather (e.g., wind, clouds, rain), tides (e.g., variance in sea levels), and seasons (e.g., less sunlight may be available for solar power generation). Accordingly, it would be advantageous to have an autonomous vessel that has a long or nearly unlimited range that can optimally navigate from one point to another point with minimal or no user interaction.

SUMMARY

Certain aspects of this invention are defined by the independent claims. The dependent claims include optional features of some embodiments of the invention. The systems, methods, and devices described herein each have several aspects, no single one of which is solely responsible for its desirable attributes. Without limiting the scope of this disclosure, several non-limiting features will now be discussed briefly.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

The miniaturization of energy harvesting techniques has led to the implementation of more advanced wireless autonomous vehicles. However, energy harvesting has been limited to miniature wireless devices due to its relatively low-energy production capabilities. For example, limited by the size of its solar panels. Moreover, energy harvesting techniques are commonly limited by the size, weight, and materials of its battery storage system. Thus, it is desirable to provide an optimized navigation method to maximize the vessel's energy storage and to produce an autonomous vessel which reaches its destination at the fastest speed allowed by its power limitations.

The disclosure herein addresses the challenges discussed and provides features and embodiments of an autonomous (unmanned) vehicle for operating on a body of water, for example, for operating on the surface of a lake, sea, or ocean. While such a vehicle can operate on an ocean or large lake (e.g., Lake Superior, Lake Ontario, etc.), it can also operate on a smaller body of water. For ease of description, "sea" and "ocean" are used herein synonymously, and used as broad terms to refer to any body of water including a lake, sea, or ocean, unless otherwise indicated explicitly or by context. Also, as used herein, "vessel" refers to any size of a vehicle configured to operate on water, and "vehicle" and "vessel" are used synonymously herein unless otherwise indicated. In some aspects, the disclosure provides a vehicle including: at least one hull; at least one solar array; hydrofoils capable of lifting the hull(s) out of the water when a certain speed through the water is achieved; at least one electric thruster, powered by at least one of the solar array and storage batteries charged at least in part by the solar array; a steering system (for example, a rudder); a sensor assembly; and a control system coupled to the thruster and the rudder, the control system configured to determine a route to control the movement of the vessel from a first point (e.g., its current location) to a destination location, wherein the determination of the route is based on information received by the control system from the sensor assembly. In some embodiments, the traversing the route keeps the vehicle in a certain area or at a certain location (e.g., within a certain distance from a certain stationary geographical location, or within a certain distance of a moving object (a "target").

In some embodiments of the unmanned ocean vehicle for operating on a surface of a body of water, the hull is structured to be collapsible to a storage configuration, for storing the vessel and/or transporting the vessel.

In another aspect, the unmanned ocean vehicle for operating on a surface of a body of water can include a pressure sensor on the hydrofoil; a light detection system configured to analyze the water ahead; an ultrasonic imaging system configured to measure height of the hull above the water and detect oncoming wave patterns; a computer configured to receive information from the pressure sensor, the light detection system, and the ultrasonic imaging system; and a control system configured to receive an output from the computer and control the hydrofoil and the electric thruster.

In some embodiments of the unmanned ocean vehicle for operating on a surface of a body of water, the electric thruster can be coupled to a wing tip. In some embodiments, the vehicle can further include auxiliary thrusters near the wing tip.

In some embodiments of the unmanned ocean vehicle for operating on a surface of a body of water, the solar array can be shaped as an air foil. In some embodiments, a panel of the solar array can be moveable, and a panel can be configured to function as an aerodynamic flap.

Another aspect of the present disclosure includes a method for operation of an unmanned ocean vehicle on a surface of a body of water. The method can include providing an unmanned ocean vehicle comprising a hydrofoil and an electric thruster; determining, using a sensor on the hydrofoil, that the unmanned ocean vehicle has capsized; and returning the unmanned ocean vehicle to an upright position automatically using a control system configured to operate the hydrofoil and the electric thruster. In some embodiments, the sensor is a pressure sensor. In some embodiments, the sensor is configured to sense moisture or water (e.g., immersion in water) and may be configured to sense a duration of time the moisture/water is sensed.

In another aspect, the present disclosure includes a method for operation of an unmanned ocean vehicle on a surface of a body of water. The method can include providing an unmanned ocean vehicle on water; the unmanned ocean vehicle including a hydrofoil and an electric thruster; measuring, using a pressure sensor on the hydrofoil, pressure of the water; analyzing, using a light detection system, the water ahead; measuring, using an ultrasonic imaging system, height of the unmanned ocean vehicle above the water; detecting, using the ultrasonic imaging system, oncoming wave patterns; receiving, by a computer, information from the pressure sensor, the light detection system, and the ultrasonic imaging system; generating, by the computer, an output; receiving, by a control system, the output from the computer; and controlling, by the control system, the hydrofoil and the electric thruster based at least in part on the output from the computer.

Some aspects of the present disclosure include an unmanned ocean vehicle for operating on the surface of a body of water. The method can include providing an unmanned ocean vehicle comprising a hydrofoil and a solar array; determining a direction of sun; and controlling the hydrofoil to tilt the unmanned ocean vehicle to a position wherein the solar array faces the direction of sun.

Another aspect includes a method for optimization processing for operating an unmanned ocean vehicle to travel a route or to maintain a station (i.e., stay at or near one location). The method can include generating a plurality of virtual waypoints between a start position and an end position; calculating travel time from the start position to the plurality of virtual waypoints; calculating power usage from the start position to the plurality of virtual waypoints; calculating travel time between the plurality of virtual waypoints; calculating power usage between the plurality of virtual waypoints; calculating travel time from the plurality of virtual waypoints to the end position; calculating power usage from the plurality of virtual waypoints to the end position; and determining, based at least in part on the travel time and the power usage calculated, a favorable movement of the vehicle.

In some embodiments, the method for optimization processing for an unmanned ocean vehicle can include implementing the favorable movement with the vehicle.

Another aspect includes a method for optimization processing for operating an unmanned ocean vehicle. The method can include generating a plurality of virtual waypoints between a start position and an end position, and accessing and/or receiving information about environmental conditions at the plurality of virtual waypoints, wherein the conditions of the plurality of virtual waypoints comprise one or more of wind conditions, wave conditions, sun conditions, rain conditions, motion conditions, or water current conditions. The method can also include determining, based at least in part on the conditions of the plurality of virtual waypoints, a first favorable movement from the start position to the plurality of virtual waypoints; implementing the first favorable movement; determining, based at least in part on the conditions of the plurality of virtual waypoints, a plurality of next favorable movements between the plurality of virtual waypoints; implementing the plurality of next favorable movements; determining, based at least in part on the conditions of the plurality of virtual waypoints, a last favorable movement from the plurality of virtual waypoints to the end position; and implementing the last favorable movement.

Another aspect includes a method for optimization processing for an unmanned ocean vehicle. The method can include generating a plurality of virtual waypoints between a start position and an end position; receiving information about environmental conditions at the plurality of virtual waypoints, where the conditions of the plurality of virtual waypoints comprise wind conditions, wave conditions, sun conditions, rain conditions, motion conditions, or water current conditions. The method can also include predicting, based at least in part on the conditions of the plurality of virtual waypoints, future conditions of the plurality of virtual waypoints, wherein the future conditions of the plurality of virtual waypoints comprise wind conditions, wave conditions, sun conditions, cloud conditions, or water current conditions; and determining, based at least in part on the conditions of the plurality of virtual waypoints and the future conditions of the plurality of virtual waypoints, a favorable movement.

In any of the embodiments, the method for optimization processing for an unmanned ocean vehicle can include implementing the favorable movement.

One innovation includes an unmanned vehicle for operating on a surface of a body of water, the vehicle comprising: a hull; a solar array comprising at least one solar panel electrically coupled to a battery; a plurality of hydrofoils coupled to the hull, the plurality of hydrofoils configured to lift the hull out of the water when the vehicle is propelled through the water; a rudder; one or more electric thrusters electrically coupled to the battery; a sensor assembly; a controller assembly configured to determine a route to move the vessel to a destination, receive information from the sensor assembly including information indicating the speed of the vessel, and control the one or more electric thrusters and the rudder to move the vehicle along the route to the destination, wherein controlling the one or more electric thrusters includes providing power to the thruster, based on the information indicating the speed of the vessel, to propel the vehicle at a speed such that the plurality of hydrofoils lifts the hull out of the water as the vehicle moves along the route for at least part of the route. The sensor assembly can include a pressure sensor configured to generate a signal indicative of the speed of the vessel based on water moving past the sensor. In some embodiments, the pressure sensor is coupled to one of the plurality of hydrofoils. In some embodiments, the sensor assembly comprises a light detection system configured to analyze the water ahead of the vessel, an ultrasonic imaging system configured to measure height of the hull above the water and detect oncoming waves, wherein the controller assembly is further configured to receive information from the pressure sensor, the light detection system, and the ultrasonic imaging system, and to control the one or more electric thrusters and rudder based at least in part on the information from the pressure sensor, the light detection system, and the ultrasonic imaging system. In some embodiments, at least one of the one or more electric thrusters is coupled to the rudder. In some embodiments, at least one of the one or more electric thrusters is coupled to one of the plurality of hydrofoils. The one or more electric thrusters can include two or more electric thrusters. In some embodiments, the solar array is shaped as an air foil. The at least one solar panel can be movable movable, and the controller assembly can be further configured to move the at least one solar panel based on information received from the sensor array. In some embodiments, wherein the sensor assembly includes an inertial measurement unit (IMU), and wherein the controller assembly is further configured to control the one or more electric thrusters and the rudder based on information received from the IMU. In some embodiments, the vehicle further comprises a satellite link, and wherein the controller assembly is further configured receive information via the satellite link and to determine the route using information received from the satellite link. The vehicle can be is configurable to an operational position and to a storage position.

Another innovation includes a method for operation of an unmanned ocean vehicle for operating on a surface of a body of water, the method comprising providing an unmanned ocean vehicle comprising a hull, a hydrofoil, a rudder, and an electric thruster; generating a route having a plurality of waypoints between a starting position and a destination; calculating a travel time from the starting position and the at least one of the plurality of waypoints; calculating power usage from the starting position to at least one of the plurality of waypoints; and determining, based at least in part on the travel time and the power usage calculated, at least one duration of time to control the electric thruster to propel the vehicle at a speed such that the hydrofoil lifts a hull of the vehicle out of the water. The method can further include measuring, using a pressure sensor on the hydrofoil, pressure of the water; analyzing, using a light detection system, water in front of the vehicle; measuring, using an ultrasonic imaging system, a height of the vehicle above the water; receiving, by a controller assembly, information from the pressure sensor, the light detection system, and the ultrasonic imaging system; and controlling, by the controller assembly, the electric thruster based at least in part on the information from the pressure sensor, the light detection system, and the ultrasonic imaging system, wherein controlling the electric thruster includes controlling the electric thruster to propel the vehicle at a speed such that the hydrofoil lifts the hull out of the water. Such methos can further comprise detecting an oncoming wave using the ultrasonic imaging system, and controlling, by the controller assembly, the electric thruster and the rudder based at least in part on information from the ultrasonic imaging system of the oncoming wave. The method can further comprise determining, by the controller assembly using information from the pressure sensor, that the vehicle has capsized; and controlling, by the controller assembly, the rudder and the electric thruster to move the vehicle to an upright position using information from the pressure sensor. In some embodiments, the controller assembly is configured to receive information related to the power level of the battery. In some embodiments, the controller assembly determines operations of the unmanned ocean vehicle based at least in part on the power level of the battery. In some embodiments, the controller assembly determines operations of the unmanned ocean vehicle based at least in part on whether the power level of the battery is above a predetermined threshold. In some embodiments, the controller assembly operates the vehicle at a speed such that the plurality of hydrofoils lift the hull of the vehicle out of the water based at least in part on a predetermined power level of the battery. In some embodiments, the controller assembly operates the vehicle at a speed such that the plurality of hydrofoils lift the hull of the vehicle out of the water based at least in part on a power level of the battery determined by the controller assembly. In some embodiments, calculating a travel time from the starting position and the at least one of the plurality of waypoints is based in part on the power level of the battery.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Overview

Figure 1:
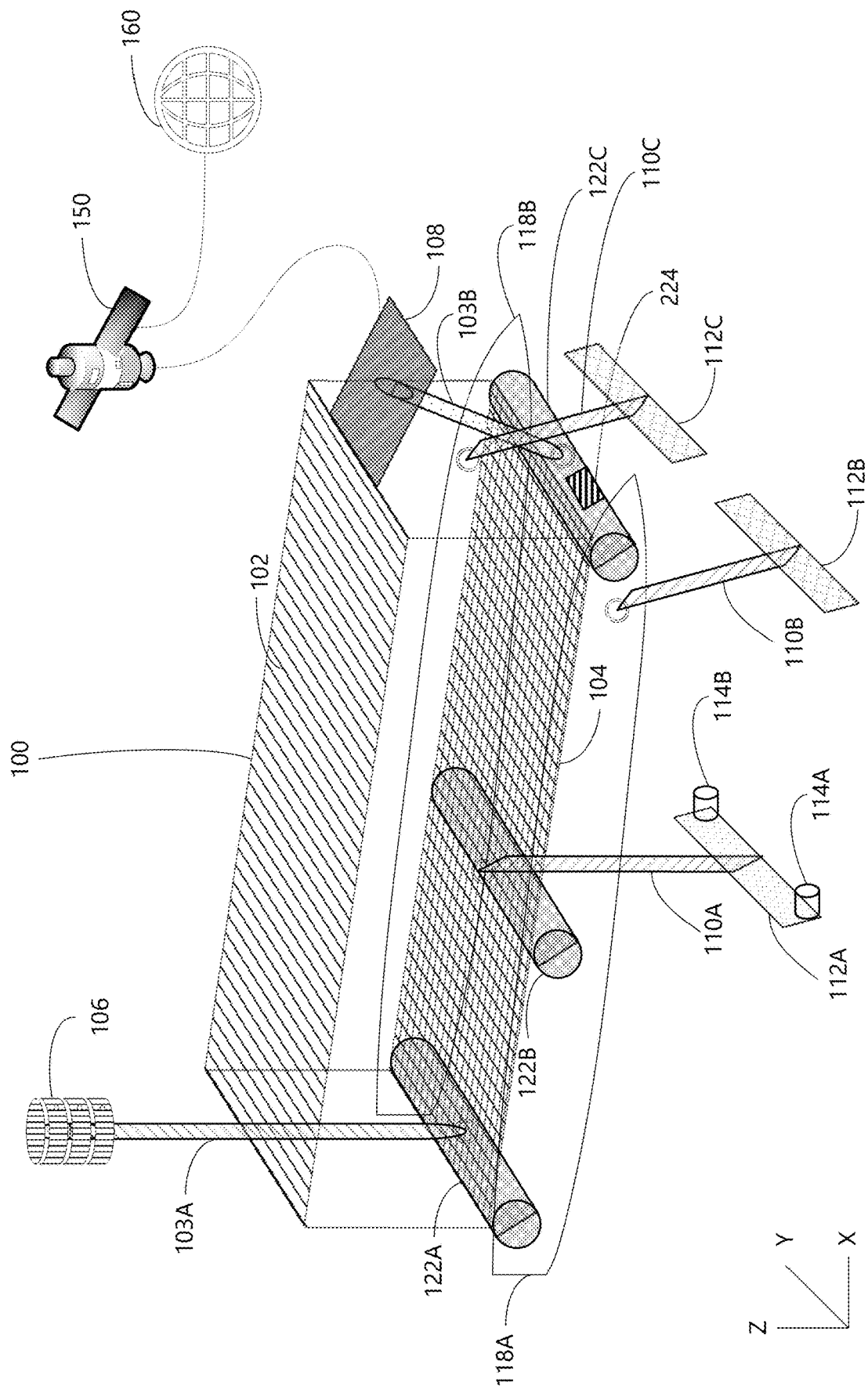
FIG. 1 illustrates schematically an embodiment of an autonomous vessel with a photovoltaic solar array and a hydrofoil.

A better understanding of different embodiments of the systems, devices, and methods described herein may be had from the following description, read in conjunction with the accompanying drawings, in which like reference characters, refer to like elements.

Recent advances in electronics and controls have led to increased possibilities for autonomous and unmanned ocean vehicle operation to perform a wide range of missions across oceans. Historically, autonomous vehicles have been associated with limited navigational range which commonly take the form of drones that either fly above the water surface at altitude, vessels submerged below the water, or in the form of slow-moving vessels. Presently, three main categories of ocean-going autonomous vessels exist: energy harvesting (solar, wind, wave energy) for propulsion; propulsion obtained from stored, expendable sources, such as hydrocarbon fuel or compressed gas; and hybrid propulsion systems.

Due to the nature of expendable sources, autonomous vessels utilizing hydrocarbon fuel or compressed gas are much larger in size requiring additional machinery for operation. This requirement increases costs of construction because of the extra space and weight needed for expendable sources. In contrast, autonomous energy harvesting vessels are much smaller and vastly less expensive because of its dependency on electrical batteries and other energy storage solutions. However, the use of energy harvesting techniques poses challenges regarding energy optimization. Although autonomous energy harvesting vessels have less human intervention and minimal user interaction compared to their expendable counterparts, there is a continuous need for efficient electrical power management to help navigate the vessel to its objective successfully. Without optimized navigational capability, the autonomous vessel is faced with performance difficulties due to inefficient use of its power and battery systems (e.g., the vessel may run out of energy before reaching its destination, or the vessel reaches its destination successfully at a slow pace). Thus, maximizing solar harvesting energy and the reserve power storage available to the autonomous vessel is of much interest.

The energy harvesting category can be separated into three subcategories: wind (using sails or turbines), solar powered (using electric motor), or wave energy (using either motors or airfoil motion). In all these subcategories, battery storage may be used to provide a constant power source and/or supplement power for propulsion in times of reduced primary energy levels. For example, solar powered vessels operating at nighttime will have a reduction in their primary energy levels to maintain effective vessel traveling speeds (e.g., due to a lack of sunlight). "Battery" as used herein is a broad term generally referring to one or more electrical power storage components.

Typically for energy harvesting autonomous vessels, there exists a limitation on either the range or the sustained speed of the vessel. This is caused by a combination of energy harvesting being limited by the size of the vessel, and the hydrodynamic drag of the vessel, which increases with size and weight. Therefore, it is desirable to develop a vessel capable of continuous medium to high speed autonomous operation that has a low or minimum amount of drag.

Disclosed embodiments can include a combination of a photovoltaic solar array coupled to a hydrofoil supported vessel. Solar arrays have been used on autonomous vessels in prior art, but they are limited to relatively low speeds due to the high drag of the vessels. By using hydrofoil technology, it is possible to raise most of the vessel out of the water and thus dramatically reduce drag. This allows the vessel to obtain higher sustained and higher top speeds. Control and computer systems on the vessel can determine how to utilize available power to move the vessel at certain times, speeds, and/or directions. The control and computer systems can determine the times, speeds, and/or directions based on received information and/or stored information. Such information can be received, for example, from one or more sensors in a sensor assembly on the vessel, sensors not on the vessel, and/or from a remote system (for example, a satellite, a ship, a shore-based system, or another autonomous vessel).

Various embodiments of a vessel are contemplated. One embodiment includes a multi-hull configuration (e.g., a catamaran, a trimaran). In some embodiments, a "deck" portion of the vessel can include a solar array. The frame and/or supporting structure of the solar array can also be part of the structure of the vessel. For example, the solar array increases the structural strength of the vessel since the solar array can include multiple modules or panels of solar cells electrically coupled together. The solar cells either directly power one or more electric thrusters and/or charge storage batteries for later use. In preferred embodiments, the vessel has one or more hydrofoils configured such that at a certain speed, the hydrofoils lift the hull9s) of the vessel lift out of the water so that the vessel is operating above the water surface and essentially, "flying" on its foils. This vessel operating above the water surface happens at a much-reduced drag level due minimizing the surface area of structure of the vessel in the water so that the power available can propel the vessel at higher speeds for longer sustained periods and/or obtain higher top speeds for intermittent periods.

Accordingly, because often the vessel is operating above the water surface, the hydrofoil vessel is no longer a "boat" in the classic sense of the word. Typically, hydrofoil vessels are propelled by sails or by large internal combustion engines, and not by solar energy. Due to the limited energy resources of solar power and batteries charged suing solar power, operations of the vessel requires using parameters relating to the vehicle size, shape, structure, and weight, and available power, such that the vehicle weight (which includes the batteries, solar panels, as well as the multihull structure and hydrofoils) can be borne by the hydrofoils at a given desirable speed for a long enough period of time using a combination of immediate solar energy and batteries such that the energy requirement is sustainable over periods of days or months to move the vessel along a desired route.

Embodiments of the vessel can include structure configured to allow the vessel to be substantially collapsed to facilitate handling, launching, shipping, etc. For example, structure of the vessel (e.g., foils, rudder, antennas, etc.) can be structured to include folding mechanisms (e.g., hinges), retractable portions, and the like. In some embodiments, a transition between storage and operation modes and could be accomplished automatically by the action of lifting the vehicle by crane or by placing the vehicle on a trailer. In cases where the unmanned ocean vehicle is to be transported to an operating docking area or independently in a remote port, there is a need for the vehicle to be readily configurable in a compact form for transportation. Preferably, the unmanned ocean vehicle can fit within a standardized shipping container and be deployable in the mission area safely without incurring damage. Moreover, the collapsed configuration facilitates launching and recovery of the vessel as the vehicle is less likely to be damaged and affected by mishandling. In another embodiment, components of the vessel can be retracted and be adjustable (e.g., hulls, rudders, hydrofoils, members, cameras, sensors, Starlink satellite communication device, solar panels, thrusters) to provide a compact configuration for the vehicle to be transported by shipping methods including but not limited to ships, cargo aircraft, rail trains, and trucks.

Another innovation includes a system to maintain level, stable flying autonomously at high speed in wildly varying ocean conditions. This consists of a sensor, computer, and control system (e.g., a sensor assembly) comprised of an inertial measurement unit (IMU), pressure sensors in and on the hydrofoils, LIDAR and camera system to look ahead into oncoming seas, ultrasonic imaging system to measure flying height and detect oncoming wave patterns. These sensor outputs are input to the computer system and/or controller and synthesized in an algorithm that ultimately controls actuators that manipulate the hydrofoils to control the movement of the vessel (e.g., 6 degrees of freedom of the vessel) and thus maintain stability and speed. In any of the embodiments, the computer system and the controller are housed together. For example, the computer system and controller can reside on the same circuit board, or reside in the same chip or chipset. In some embodiments, the computer system and controller are essentially the same system, where the computer system portion determines routes, waypoints, and parameters for moving the vehicle to one or more destinations, and the controller provides control signals to operate a rudder and thruster to move the vehicle at a determined speed and in a determined direction to reach the one or more destinations, including to move the vehicle at a speed such that the hydrofoils lift the hull of the vehicle out or the water while it is moving along the route.

Another innovation includes an autonomous mechanism and method for righting the vessel in the instance of it having capsized due to wind and wave interaction. Without this system, capsizing would be catastrophic for the vessel and the mission because it could no longer proceed and would simply be floating salvage. With the righting system, the vessel would be returned to an upright position, floating properly, and thus, able to resume its intended mission. In some embodiments, the vessel may include a sensor assembly (e.g., wind detector, current detector, sun detector, cloud detector, attitude sensor, acoustic sensor, pressure sensor, wave detector, and/or camera) comprising an IMU, which is an electronic device that can measure and determine one or more forces, angular rates, and/or orientations of the vessel using a combination of accelerometers, gyroscopes, global positioning systems, and/or magnetometers. In another embodiment, the sensor may include more than one sensor and the sensor can also be an inclinometer, LIDAR, and/or camera system (e.g., more than one camera). In any case, the sensor assembly can be electronically coupled to a computer or processing unit to provide raw or processed electronic signals to the processing unit, indicating the orientation of the vessel (e.g., magnitude and direction of how the vessel is moving over time and how hard the vessel is being pitched in the water by the weather such as the wind, waves, and current). When the processing unit receives signals from the accelerometer, IMU, and/or camera determining the vessel has capsized or submerged, the computer and/or controller may execute commands and adjust any one component of the vessel to recover its orientation (e.g., execute recovery when a component of the vessel is exceeding a predetermined angle longer than a certain amount of time).

Another innovation includes a further drag reducing system, accomplished by coupling the propulsion thrusters to the wing tips and arranging for the thruster flow field to mitigate the induced drag inherent and manifesting itself at the wing tips when the vessel is flying on its foils. Auxiliary thrusters can further be mounted at or near the wing tips of any aerodynamic machine to help reduce drag.

Another innovation includes a solar array structured as a airfoil. For example, where its framing and support are configured to function as airfoil or a section of an airfoil. section. This airfoil would then provide some vertical lift for the vehicle, augmenting the lift generated by the hydrofoils. Since the aerodynamic drag of the solar panel array is present even in a completely planar configuration and the drag rises only slightly by shaping the array properly into an aerodynamic lifting surface, the lift that the solar array provides comes at a very small cost in terms of added drag, and thus by reducing the lift required from the hydrofoils, the overall drag is reduced at cruising speed.

Another innovation includes a three-dimensional (3D) arrangement of solar panels to minimize deck area requirements while maintaining necessary solar power generation. The 3D arrangement can be two or more solar panels arranged in a stack and spaced apart such that all, or nearly all, of a top solar panel and at least a portion of a solar panel positioned below the top solar panel is positioned to receive sunlight. The solar power available is dependent on latitude and time of day, both of which dictate the solar elevation angle. To capture sufficient amounts of solar power at higher latitudes during winter months, it can be necessary to optimize the ability to capture energy at low solar elevation angles. One simple way to do this is to increase the solar panel area. However, this may pose structural challenges and be counterproductive since it can cause the vehicle to be bigger and heavier. Thus, a vehicle with a large solar panel density requires more power to fly at speed. Accordingly, embodiments can include a stack of horizontally aligned solar panels, one layer above the other, with a vertical separation distance calculated to provide optimum performance to capture solar energy. In some embodiments, the stack of solar panels can include a minimum of two solar panels (or two or more layers). In some embodiments, the stack of solar panels can include more than two solar panels. In some embodiments, on a lower layer, the solar cells can be positioned around the edges of the panel, and a center section that typically is in the shade of an upper solar panel can be used to hold other equipment or include an aperture to save weight.

Another innovation includes a configuration such that the vessel is operable to roll the vehicle, up to some limit angle so that solar deck presents a better incidence angle to the sun. This is accomplished by actively utilizing the hydrofoils, not to keep the boat level, but to tilt it to one side or the other. Unless the boat is headed directly toward or away from the sun, tilting or rolling the vessel in the correct direction would be beneficial to the solar power output. Additionally, the vessel can tilt or roll to ensure that a lower solar panel is not in the shade of an upper solar panel. This ability can also be associated with power management and route optimization strategy. Based on sensed environmental factors and other information including navigation information, the vessel can determine optimum position of the vessel and operate the vessel to proceed on a path and at a certain roll position to best generate solar energy.

Accordingly, embodiments of the disclosed vessels and systems include one or more of: (i) an autonomous ocean going vessel using solar power and hydrofoil technology together; (ii) incorporating mechanism to alternate between operational mode and collapsed storage mode; (iii) incorporating autonomous system to maintain flight; (iv) incorporating system to autonomously right itself after capsize; (v) incorporation of drag reduction system using thrusters to mitigate induced drag; (vi) a solar panel array shaped like an airfoil section to provide vertical lift and thus augment the hydrofoil lift; (vii) one part of the solar array is movable relative to the rest of the array, controlled by a computer, acting as an aerodynamic flap for the solar panel airfoil to control the lift generated by the solar panel airfoil; (viii) a solar array arranged in a three dimensional arrangement to maximize output power while minimizing deck area; and (ix) where the vessel can be rolled to some angle during steady flight, so that the solar deck is at more beneficial angle to the sun's incident rays.

The following is a list of certain components that are described and enumerated in this disclosure in reference to the above-listed figures. However, any aspect of the devices illustrated in the figures, whether or not named out separately herein, can form a portion of various embodiments and may provide basis for claim limitation relating to such aspects, with or without additional description. Enumerated components include:

102 Upper Solar Panels
103 Member, Structural Component
104 Lower Solar Panels
106 Sensor Assembly, Camera, LIDAR, Radar, Wind Sensor, Detectors
108 Starlink Satellite Communication Link
110 Rudders
112 Hydrofoils
114 Thrusters
118 Hulls
122 Crossbeams for Supporting Solar Panel Arrays and Housing the Computer 224
126 Solar Panel Airfoil Section
150 Satellite
160 Internet
224 Computer or Processing Unit
250 Processor
255 Memory
260 Communication Interface
265 Transmitter/Receiver
270 Algorithm
275 Solar Information, Battery State
300 Starting point of the Optimization Method
330 Predictions, Observations, Recent History Inputs
332 Comparing Predictions, Observations, Recent History
334 Modifying Predictions, Confidence Levels
336 Navigation Update
338 Command, Objective Update
340 Inputs of the Optimization Algorithms
342 Choice
343 Optimization Algorithms
344 Execution by Controller
345 Periodic Updates
400 Starting Point of the Optimization Method
410 Inputs Related to Waypoint Determination
420 Determine Waypoint
430 Determine Objective of the Waypoint
440 Objective Deadline
450 Increase Probability of Success by Decreasing Speed
455 Vary Speed and Course
460 Vary Course
465 Vary Speed
470 Update Periodically
500 Starting Point of the Optimization Method
510 Inputs Related to Survey Point Determination
520 Determine Observation Points
530 Determine Survey Points
540 Survey Grid Order Specification
550 Pass By Commands
555 Pass By Commands According to Survey Order
557 Stop At Commands
560 Automatic Commands
570 Update Periodically
600 Controller
601 Inputs
602 Outputs
603 Controller Assembly
605 Outputs Adjusting and/or Controlling Components
615 Control Optimal Movement
620 Control Hydrofoils, Thrusters, Rudders
625 Control Recommended Power Usage
630 Control Navigation via GPS, Direction, Orientation, Speed
635 Control Solar Panels
640 Control Energy Consumption
660 Outputs Related to Models
661 Models Available (Sun Position and Solar Power)
662 Models Available (Speed v. Drag, Speed v. Power)
665 Outputs Related to Commands and Objectives
670 Power Management
675 Waypoints (e.g., Single, Multiple)
680 Survey Grid (e.g., Reaching Destination Quickly as Possible Based on Deadlines)
700 Starting Point
710 Determine Minimum Time and/or Survey Grid on a Schedule
720 Test Forward Positions
730 Determine Current and/or Predicted Conditions
740 Determine Favorable Movements
750 Estimate Future Positions
760 Provide Secondary Tests
770 Update Periodically
790 Destination Point
800 Starting Point
810 Receive Confidence Level Predictions
820 Receive Array of Virtual Waypoints
830 Calculate Every Route Possible Within Limitation of Waypoint
840 Break Down Waypoints and Predict Travel Time
850 Calculate Most Efficient Travel Time and Power Use
860 Analyze Power Options and Conditions at Future Waypoint
865 Execute Most Efficient and/or Optimal Power and Travel Time Option
870 Update Periodically
890 Destination Point
900 Starting Point
901 Calculate New Derivative Waypoint
910 Determine New Waypoint
920 Determine Most Promising Direction and Most Promising Speed
930 Weight Previous Waypoint to Promote Movement
940 Waypoint Deviation
950 Weight New Waypoint to Promote Movement
960 Move Forward to New Operating Waypoint
970 Update Periodically
990 Destination Point
1001 Hulls
1002 Solar Panels
1003 Stabilizing Beams
1004 Computer
1005 Rudders
1006 Hydrofoils
1007 Thrusters
1008 Hinge

Illustrative Embodiment

Embodiments of the systems and devices described herein are related to generating energy using solar panels and using the energy in an optimized manner to navigate bodies of water with a hydrofoil supported autonomous vessel (sometimes referred to herein as "autonomous hydrofoil vessel", "hydrofoil vessel", or simply, "vessel" or "vehicle" for ease of description).

Certain aspects of an embodiment of an autonomous hydrofoil vessel 100 are illustrated in FIG. 1. The hydrofoil vessel 100 can include one or more solar panels 102, 104, one or more hydrofoils 112A-C, one or more rudders (which may be referred to as a "rudder" for ease of reference) 110A-C, one or more thrusters (which may be referred to as a "thruster" for ease of reference) 114A, 114B, and one or more hulls 118A, 118B (which may be referred to as a "hull" for ease of reference). For example, in some embodiments, the hydrofoil vessel 100 can include two hulls 118A, 118B to reduce drag and draft of the hydrofoil vessel. The hulls 118A, 118B can be elongated portions across from each other along an "X" direction so that it can be configured to float on water. The hulls 118A, 118B can also be connected together by stabilizing beams 122. In some embodiments, the vessel 100 can have three stabilizing beams 122A, 122B, 122C. The stabilizing beams 122 can keep the vessel 100 stable on the surface of the body of water. The stabilizing beams 122 can extend horizontally, or in a "Y" direction, at least partially across the vessel. In another embodiment, the stabilizing beams 122 can be perpendicularly attached to the hulls 118 for support purposes. In some embodiments, members 103, solar panels 102, 104, rudders 110, and hulls 118 can be positioned on the stabilizing beams 122. In some embodiments, the members 103 can be structural elements or components that are at least partially circular, cylindrical, or spherical in shape. In some implementations, the hulls 118 can have a larger width on one end of the hulls 118. The width of the hulls 118 can increase in an "X" direction. In any of the embodiments, the components can be positioned in any direction and is not limited to an "X", "Y", or "Z" direction.

In other embodiments, the hydrofoil vessel 100 can include one, three, four, or more than four hulls 118. Some embodiments can also include one stabilizing beam 122, two stabilizing beams 122, four stabilizing beams 122, or more than four stabilizing beams 122. The stabilizing beams 122 can also be crossbeams. In any one of the embodiments, the vessel 100 may be comprised of one or more of its component parts.

The hydrofoil vessel can include a means and mechanism to allow the vessel to be substantially collapsed in size to facilitate handling, launching, shipping, etc. In some embodiments, the vessel can transition between storage and operation modes. In some other embodiments, the vessel can autonomously transition between storage and operation modes. The frame of the vessel 100, including the hulls 118 and stabilizing beams 122, can also be collapsible. In some embodiments, any one of the components of vessel 100 can be collapsible.

In some embodiments, the hydrofoil vessel 100 can include at least one solar panel. In this embodiment, the solar panel can be rectangular. The solar panels can also be positioned relatively horizontally such that they receive at least some sunlight on the energy generating surface of the solar panel during the day, regardless of the direction the vessel is pointing. The solar panels can be disposed on an upper exterior portion of the vessel. The structure of the solar panels can improve the structural integrity of the vessel. In this example, an upper solar panel 102 may be stacked above (e.g., in the "Z" direction) a lower solar panel 104 with a space between. This configuration can allow the vessel 100 to receive additional solar power with the same footprint, or profile from above (in the "Z" direction). The upper solar panel 102 and lower solar panel 104 can be substantially vertically aligned. The upper solar panel 102 can be positioned such that it does not cover the lower solar panel 104, only partially covers the lower solar panel 104, or only partially covers the lower solar panel 104 from sunlight at certain angles. The solar panels can also be moveable, for example automatically moveable by a controller 600 such as the controller in FIG. 6.

In some embodiments, the solar array can shift into an airfoil section (not pictured) that provides vertical lift for the vessel, augmenting the lift generated by the hydrofoils 112. Airfoil sections can cause less drag and therefore increase the efficiency of the vessel at cruising speed. The solar array can shift into an airfoil section based on input from a controller 600. One section of the solar array can be moveable into the airfoil section. One section of the upper solar array 102 can be moveable into the airfoil section. The section of the solar array moveable to the airfoil section may include a mechanical assembly configured to move the solar array. Moving the solar array can include one portion of the solar array raising vertically in the "Z" direction. The airfoil section can be connected with a hinge to the rest of the solar array. The airfoil section can be aerodynamic or shaped to stabilize the vessel. The airfoil section can provide vertical lift similar to an airfoil of an airplane wing. The amount of lift generated can be varied by the moveable flap. The airfoil section can decrease lift or provide downward force if strong winds or other factors increase the probability of capsizing. The aftmost 20% of the airfoil can be moveable to rotate up or down about the transverse axis of the foil. In some embodiments, the aftmost 10-30% of the airfoil can be moveable to rotate up or down about the transverse axis of the foil. In some embodiments, the aftmost 1-50% of the airfoil can be moveable to rotate up or down about the transverse axis of the foil.

The vessel 100 can include one or more sensors positioned at a location to sense the environment. For example, in some embodiments, a member 103 can extend above (e.g., i.e., vertically in the "Z" direction) at least a portion of the hydrofoil vessel 100. In some embodiments, one or more sensors can be positioned on or in the member 103. In the embodiment illustrated in FIG. 1, a sensor assembly 106 can be positioned on the member 103A. The sensor assembly 106 can include one or more components and sensors, housed in one or more housings, and can include, for example, a camera, LIDAR, Radar, attitude sensor, acoustic sensor, and/or a wind sensor. In some embodiments, the sensor assembly 106 can include a pressure sensor, light detection system, and/or an ultrasonic imaging system. The sensors can measure features of the water ahead. In some embodiments, the member 103 is a circular staff. In some embodiment, the sensor assembly 106 can include a global positioning system (GPS). In some embodiments, the hydrofoil vessel can include multiple members extending from the hydrofoil vessel 100. The member 103 can extend vertically higher than the solar panel 102. Disposing one or more sensors in a single sensor assembly 106 can be advantageous for ease of wiring, maintenance, and space efficiency. The sensor assembly 106 can also contain a light detection system configured to analyze the water ahead. In some embodiments, the light detection system can be external to the sensor assembly 106. In any one of the embodiments, a computer 224 can be configured to receive information from the pressure sensor, light detection system, and the ultrasonic imaging system. In some embodiments, the vessel 100 can use an ultrasonic imaging system to measure the height and pattern of upcoming waves and the height of the vessel over those waves and wave patterns. In other embodiments, the vessel can use the computer 224 to assist in maintaining the vessel's 100 ability to stay on the hydrofoils 112. The vessel can use the computer 224 to assist in keeping the hull 118 out of the water and therefore keeping drag to a minimum. For example, the computer 224 can calculate an optimal tilt angle, movement speed, vessel height, or other parameter to keep drag to a minimum. The computer 224 can automatically control the hydrofoil vessel 100 and/or output the results of calculations to a user.

In some embodiments, the hydrofoil vessel can include a satellite communication link (for example, a satellite receiver or transceiver). In some embodiments, the hydrofoil vessel can include a Starlink communication device or satellite communication link 108. The satellite communication link can be positioned on an upper portion of the hydrofoil vessel 100. In some embodiments, the Starlink communication device 108 can be positioned on the member 103B (e.g., a circular staff) extending vertically above the vessel 100. The sensors of the sensor assembly 106 can transmit information to a computer 224. The sensors of the sensor assembly 106 can also transmit information to a controller 600. The Starlink communication device 108 can transmit information to a computer 224. The Starlink communication device 108 can also transmit information to a controller 600. In some embodiments, the satellite communication link 108 can transmit information and/or receive a wireless command from a remote and/or onboard source (e.g., satellite 150, controller, sensors 106, computer 224) or data from the internet 160. Variety of information such as weather conditions can be transmitted and/or received from other remotes sources such as another satellite, vessel, and/or land-based transmitter. In another embodiment, the satellite communication link 108 can be receiving and transmitting from more than one source. A controller assembly 603 can include the computer 224 and controller 600.

The hydrofoil vessel 100 can include one or more rudders 110 extending generally downward in a "Z" direction, attached to the underside of the vessel 100, such that the one or more rudders 110 can be positioned underwater during operational use. The rudders 110 can be used to steer the vessel. The rudders can be moveable based on information from a navigation system, or controls from a user. Some embodiments include two front rudders 110 with a hydrofoil 112 and two thrusters 114 attached to each side of the hydrofoil 112 for a total of four thrusters 114. Some embodiments include thrusters 114 attached to the rear hydrofoils 112, for a total of eight or more thrusters 114. Other embodiments include less than eight thrusters. In some embodiments, there are as few as a single rudder 110 and a single thruster 114. In any one of the embodiments, the vessel can optimize the problem of drag by utilizing hydrofoils 112 to lift the vessel out of the water. In some other embodiments, the thrusters 114 can either be powered by the solar array directly, or powered by the reserve battery when solar power is unavailable.

Each rudder 110 can include a rudder hydrofoil 112 on the distal end of the rudder 110. In some embodiments, the rudders 110 can be flat, or substantially flat, along one plane so as to create less drag while moving through water. Each rudder can have a length dimension as to extend the rudder into the water to provide the ability to navigate. In some embodiments, the navigation can be executed by steering the direction of the vessel in relation to the direction of the water flow that is moving across the rudders 110 and rudder hydrofoils 112, and wide enough on one plane to provide the desired durability and steering ability without the rudders being so thick on any one side to create unnecessary drag. In some embodiments, the vessel 100 can include a single rudder 110 and a hydrofoil 112 coupled to the rudder 110. The vessel 100 can further include one or more thrusters 114. Each thruster 114 can include a rotatable propeller to drive the vessel 100 forward. In some embodiments, the thruster 114 can be operated to drive the vessel 100 in reverse. The rudder 110 can be moveable by a controller 600. The hydrofoil 112 and thruster 114 can also be moveable by a controller 600. Movement of the rudders 110, hydrofoils 112, and/or thrusters 114 can change a direction of movement of the vessel 100. Movement of the rudders 110, hydrofoils 112, and/or thrusters 114 can allow the vessel 100 to also right itself (e.g., when submerged underwater, direct the vessel to re-orient itself in its upright position). In another embodiment, movement of the rudders 110, hydrofoils 112, and/or thrusters 114 can change a position or orientation of the solar panels with respect to the sun. Movement of the rudders 110, hydrofoils 112, and/or thrusters 114 can change a speed of the vessel 100. The vessel 100 can also include wing tips. The vessel can reduce drag by attaching thrusters 114 to the wing tips. The vessel can arrange for the flow field to mitigate the induced drag at the wing tips when the vessel is flying on its foils 112.

Figure 2:
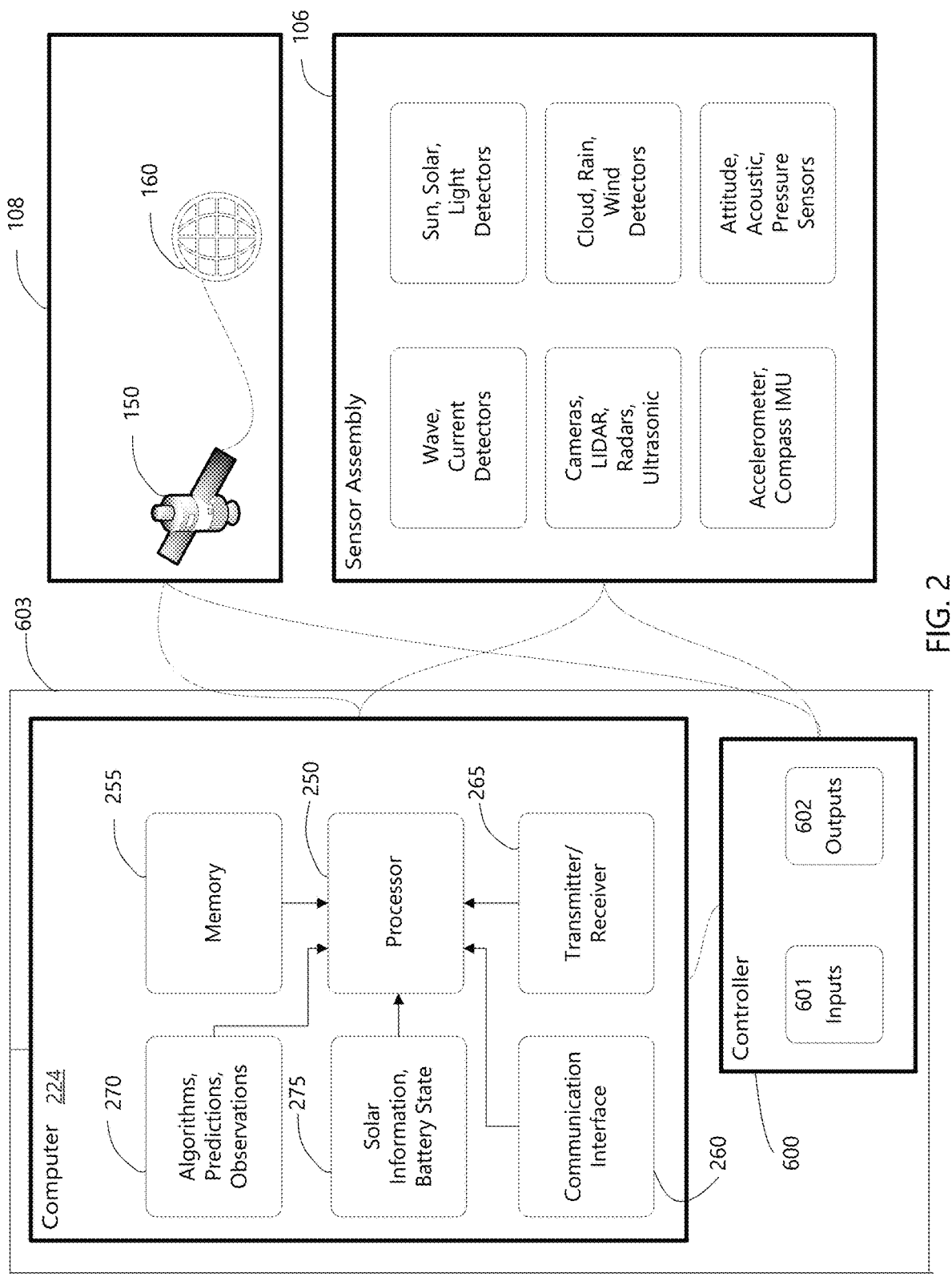
FIG. 2 illustrates a block diagram of an embodiment of an autonomous vessel comprising of a computer connecting to a Satellite for internet data, a sensor assembly for various information regarding ocean conditions, and a controller for control of the vessel's components.

FIG. 2 illustrates certain additional aspects of examples of a hydrofoil vessel, including hardware that is used for sensing environmental conditions, communication, and performing navigation. In some embodiments, the computer 224 is housed in a stabilizing beam 122 that also acts as a part of the frame of the vessel 100. In some embodiments, the computer 224 can be housed external to the stabilizing beam 122. The computer 224 can have its own housing assembly and is supported by a means of attachment to the stabilizing beam 122. In some other embodiments, the vessel can maintain level, fly with stability, operate autonomously, and run at high speeds in wildly varying ocean conditions. In some embodiments, the vessel herein 100 can include a controller configured to receive information from an inertial measurement unit, pressure sensors in and on the hydrofoils 112, LIDAR, a camera system, and other sensors in a sensor assembly 106 to look ahead into oncoming seas. Some embodiments include ultrasonic imaging system to measure flying height as well as detect oncoming wave patterns. In some embodiments, the methods herein can include the sensor outputs inputted into the computer 224 system and synthesized in an algorithm 270 that ultimately controls actuators that manipulate the hydrofoils 112 to control the 6 degrees of freedom of the vessel and thus, maintain stability and speed. In any one of the embodiments, part of the solar array can be moveable relative to the rest of the array, as controlled by the computer 224.

In various embodiments, a sensor assembly 106 can one or more sensors and/or detectors ("sensors"). For example, one or more of a: power sensor to determine a power level of a battery, a power sensor to determine a power level of a solar panel; wave sensor; current sensor; sun, solar, light sensors; camera; LIDAR; RADAR; ultrasonic sensor; cloud, rain, and/or wind sensor; sun, solar, light sensors; accelerometer; compass; inertial measurement unit (IMU); altitude sensor; acoustic sensor; and/or pressure sensor. In some embodiments, the sensor assembly 106 can one or more of waves, water current, oncoming obstacles, pressure, vibrations, and wind, which can affect the speed and stability of the vessel. In some embodiments, the sensor assembly 106 can measure sunlight, clouds, and rain which can affect the ability of the solar arrays to generate power. In some embodiments, the sensor assembly 106 can measure the speed and direction of the vessel, which can ensure that the vessel is moving in the desired direction at an optimal speed. In some embodiments, the sensor assembly 106 is positioned on the vessel and in communication with the computer 224 and/or the controller 600 on the vessel. In some embodiments, a sensor assembly 106 is located remote from the vessel (e.g., not on the vessel) and is in communication with the controller 600 and/or the computer 224 on the vessel. In some embodiments, a sensor assembly 106 is located on the vessel and is in communication with a controller 600 and/or a computer 224 on the vessel, and the controller 600 and/or the computer 224 is also in communication with a sensor assembly 106 not on the vessel.

In some embodiments, the computer 224 can include a receiver or a transceiver 265 for receiving signals from one or more remote sources. For example, receiving wireless communication signals from a satellite 108 (for example, a Starlink satellite), or a sensor assembly 106. The wireless communication signal can further include various information but is not limited to weather data pertaining to wind, wave, sun, cloud, and water current conditions. Any of the information can further be stored in a memory of the processing unit or computer 224. In some embodiments, the sensor assembly 106 and/or satellite 150 via internet 160 can send signals to processing unit 224 comprising information including but not limited to: magnitude and/or direction of acceleration, wave height, wind speed, sounds and/or images and/or video images captured by the cameras. With the information, the computer 224 may output to a controller 600 by comparing values or data stored in the memory of the processing unit 224. The controller 600 can determine the commands using the information from computer 224 for: controlling one or more favorable and unfavorable movements of the vessel (e.g., a route, a series of waypoints along a route), controlling one or more components of the vessel, and/or controlling the travelling speed of the vessel. In any embodiment, the computer 224, satellite 108, and/or sensor assembly 106 can be connected to more than one controller and more than one remote source at the same time.

In some embodiments, the computer 224 can include a processor 250, a memory 255, a communication interface 260, a transmitter/receiver 265, an algorithm 270, and solar information/battery state 275. The functional blocks shown in FIG. 2 could be arranged in various manners in other embodiments, and that some basic functional blocks of a computer or processing unit have been omitted, such as a power supply, for clarity. In some embodiments, the processor 250 can be configured to provide general operation of the computer 224 by executing processor-executable instructions stored in memory 255 (e.g., executable code, programming code). Processor 250 can further comprise one or more microprocessors, microcontrollers, and other discreet components (e.g., application-specific integrated circuits). Memory 255 can comprise of one or more non-transitory information storage devices including but not limited to RAM, flash memory, ROM, or virtually any other type of electronic, mechanical, or optical storage device. Memory 255 can further be used to store the processor-executable instructions for operation of the computer 224 as well any other information used by processor 250. Such information may include but is not limited to the following data: solar panel angles, wave conditions, water current conditions, wind detectors, speed from an accelerometer/IMU, sun detectors, cloud/rain detectors, attitude sensors, acoustic sensors, pressure sensors, ultrasonic sensors, and/or light detectors. In some embodiments there may be more than one processor 250 and more than one memory 255. In another embodiment, the memory 255, or at least a portion of the memory, can be incorporated into the processor 250 (e.g., microcontroller, custom application-specific integrated circuits, on-board memory devices).

In another embodiment, the computer 224 includes a communication interface 260 to electronically communicate with any of the components shown in FIG. 2. In some embodiments, processor 250 may receive a information from a remote source, such as a satellite 108 and/or a sensor assembly 106, (e.g., via transmitter/receiver 265) to determine a certain command concerning the vessel (e.g., commands, objectives, information about weather models, wave models, sun models, observations). In any embodiment, there may be more than one computer communicating with more than one remote source. In another embodiment, the computer 224 includes and can execute an algorithm relating to route optimization, power management, calculations, and predictions. In any one of the embodiments, the vessel is comprised of one or more computers.

Figure 3:
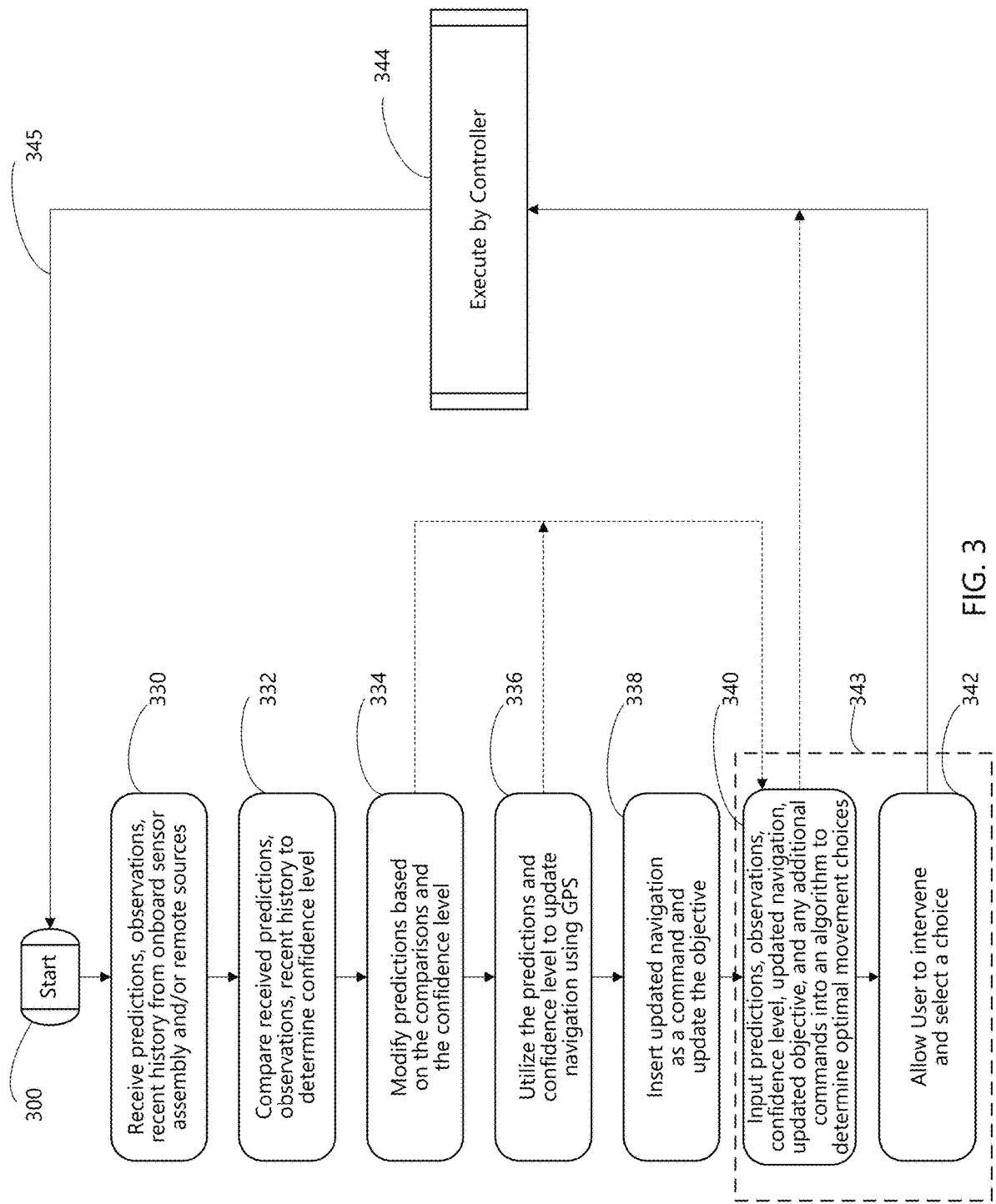
FIG. 3 illustrates a flow chart of an example of a power management routing optimization method.

FIG. 3 illustrates a method of Routing Optimization in the form of a flow chart. In any of the Routing Optimization embodiments, not all of the method steps shown in FIG. 3 are necessarily performed and that the order in which the steps are to be performed may be different in other embodiments. In some embodiments, the computer 224 may receive predictions, observations, recent history, and other related information and/or data from a satellite 150 with internet 160 and/or from a sensor assembly 106. The computer 224 can then compare the predictions, observations, recent history, and other related information to retrieve a confidence level which calculates the accuracy and success rate of the vessel's objective. Next, the computer 224 may modify the predictions and update the navigation based on the predictions, observations, recent history, confidence level, and other related information. Once the modifications are complete, the processing unit will further optimize the algorithm on-board or from a remote source (e.g., a computer or a controller). In some embodiments, the computer uses one of a set of one or more predetermined algorithms to determine an optimized route, where the use of a particular algorithm can be based on, for example, parameters of the vessel itself (e.g., thruster(s), hydrofoils, vessel payload), geographic location of the vessel, distance of the route. In some embodiments, a user may manually select and communicate to the vessel which algorithm to use, or provide an algorithm to the vessel. The processing unit of the vessel may automatically execute the commands to use the navigation method to complete its objective (move along the route). In some embodiments, these series of steps may be periodically updated by a time set by the processing unit or manually with a time set by the user.

The flowchart in FIG. 3 illustrates various processes that the computer and or controller can perform to control the vessel. In some embodiments, the methods herein include starting navigation optimization of a vessel's route 330. In some embodiments, the route optimization may include receiving predictions 330. The predictions can include receiving weather predictions, wave predictions, sun predictions, time predictions, positional predictions, power predictions, confidence level predictions, and modeling predictions (e.g., weather, wave, sun, wind, current, cloud, rain).

In some embodiments, the methods herein can include receiving observations. The observations can include weather observations, wave observations, sun modeling observations, time observations, positional observations, power observations, and confidence level observations. Confidence level can be the probability of success of reaching the objective in the desired time. In some embodiments, the methods herein include receiving recent history. The recent history can include weather history, wave history, sun modeling history, time history, positional history, power history, and confidence level history.

In some embodiments, the methods herein include receiving and comparing predictions, observations, and recent history 332 to modify predictions and create a confidence level 334. The confidence level 334 can include how accurate the predictions are. The predictions can be based on the observations and recent history. The predictions can also be based on an external database.

In some embodiments, the methods herein further include utilizing the predictions and confidence level 334 to update navigation 336. In some embodiments, the methods herein include utilizing the navigation update 336 to update the objective and issue new commands 338 to the vessel 100.

In some embodiments, the methods herein can also include optimization algorithms 343 that determine optimal movement based on inputs. The optimization algorithms 343 can be executed and run on-board and/or remotely from a remote source. The optimization algorithms 343 can further be comprised of optimized algorithm 340 and selection of algorithm choices 342. In some embodiments, the inputs to the optimization algorithms can be modified predictions and confidence levels, navigational updates, objective updates, and new commands. The optimized algorithms 340 can determine an optimal movement for the vessel based on the predictions. Optimal movement can include the fastest way to reach a goal or objective. Optimal movement can also include a way to reach a goal with minimized risk of losing power of the vessel. Optimal movement can account for multiple potential benefits and risks associated with a path and recommend a path to the vessel based on the same benefits and risks. The benefits and risks can be weighted in the optimization algorithm 343. In any one of the embodiments, there may be more than one optimization algorithm 343.

In some embodiments, the optimized algorithms 340 can be utilized to make a choice 342 of how best to navigate to the objective and execute 344 that choice. In some embodiments, the chosen path can be executed autonomously by the controller 600. In other embodiments, the chosen path can be executed by a user controlling the vessel. In any one of the embodiments, a user can choose between paths based on an output from the optimized algorithms 340. In any of the embodiments, the routing optimization can be updated periodically 345 automatically by one or more controllers, by one or more remote sources, by one or more computers, and/or by one or more users controlling the vessel.

Figure 4:
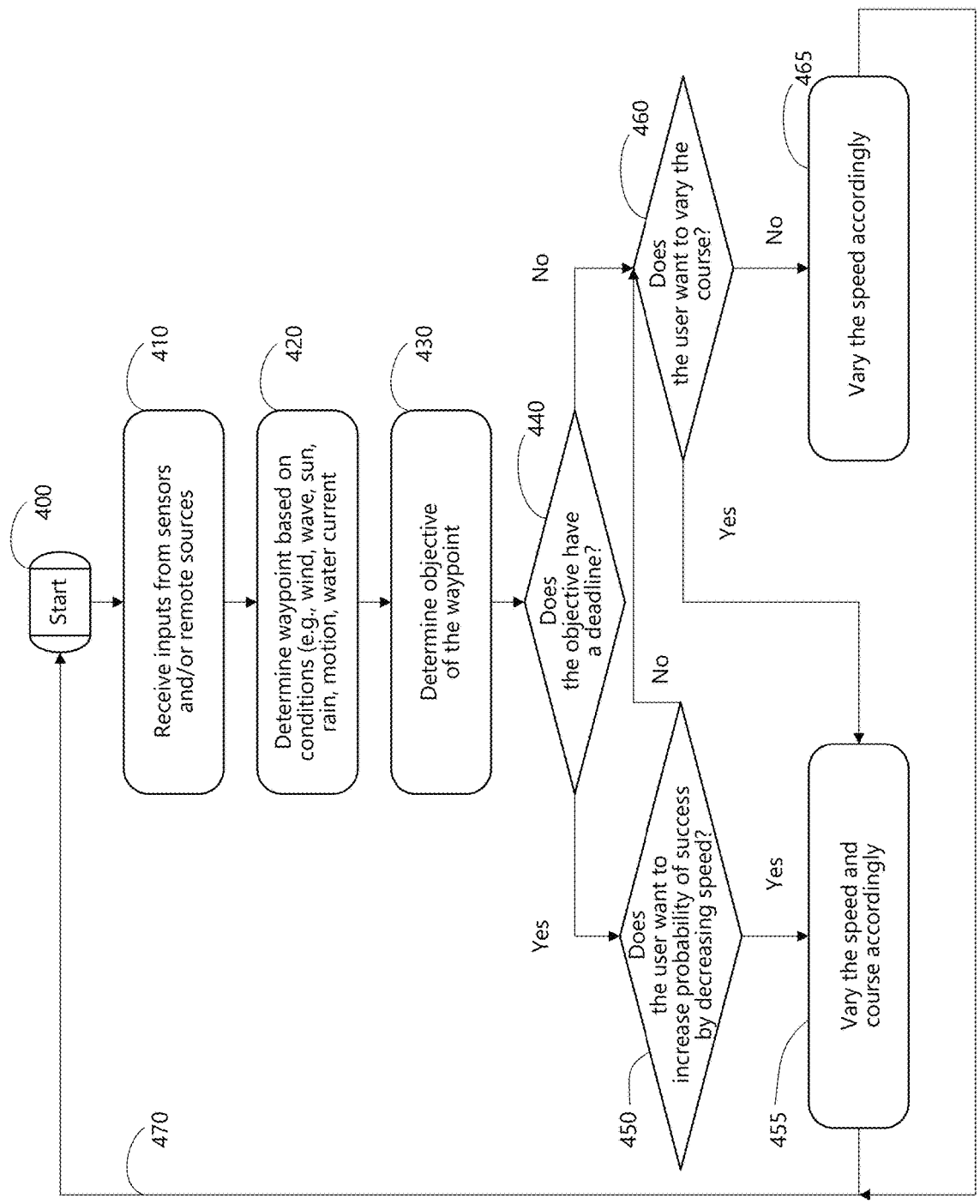
FIG. 4 illustrates a flow chart depicting course and speed variables in autonomous vessel navigation optimization.

FIG. 4 illustrates variables in an autonomous vessel navigation optimization algorithm that may affect the vessel's probability of performing its objective successfully. In any of the navigation optimization embodiments, not all of the method steps shown in FIG. 4 are necessarily performed and the order in which the steps are to be performed may be different in other embodiments. In some embodiments, the vessel may take a single waypoint to travel to its destination or complete its objective as quickly as possible. This single waypoint may include varying speed based on wind conditions, wave conditions, sun conditions, rain conditions, motion conditions, or water current conditions. In another embodiment, if the objective is to reach a certain waypoint by a deadline, it may be advantageous to take a more conservative course and vary speeds accordingly to increase the probability of success.

In some embodiments, the navigation optimization tool 400 receives inputs 410 from a sensor assembly and/or other remote sources. The optimization tool further determines a waypoint 420 based on weather and ocean conditions (e.g., wind, wave, sun, rain, motion, and water current). The optimization tool can further determine the objective of the waypoint 430 and determine whether the objective has a deadline 440. The deadline may be provided in a communication to the vehicle (e.g., from a user input) or automatically determined by a controller 600. If the objective has a deadline 440, and the user wants to increase the probability of success 450 and decrease the speed of the vessel, the vessel will vary the speed and course accordingly 455. This step can be periodically updated 471 throughout the vessel's journey. If the user does not want to increase probability of success and/or decrease speed of the vessel, the user may determine that they only want to vary the course 460. If the user wants to vary the course 460, the vessel may also vary the speed and course accordingly 455. If the user does not want to vary the course, the vessel may vary only the speed 465. In any one of the embodiments, these steps can be updated periodically 470.

Figure 5:
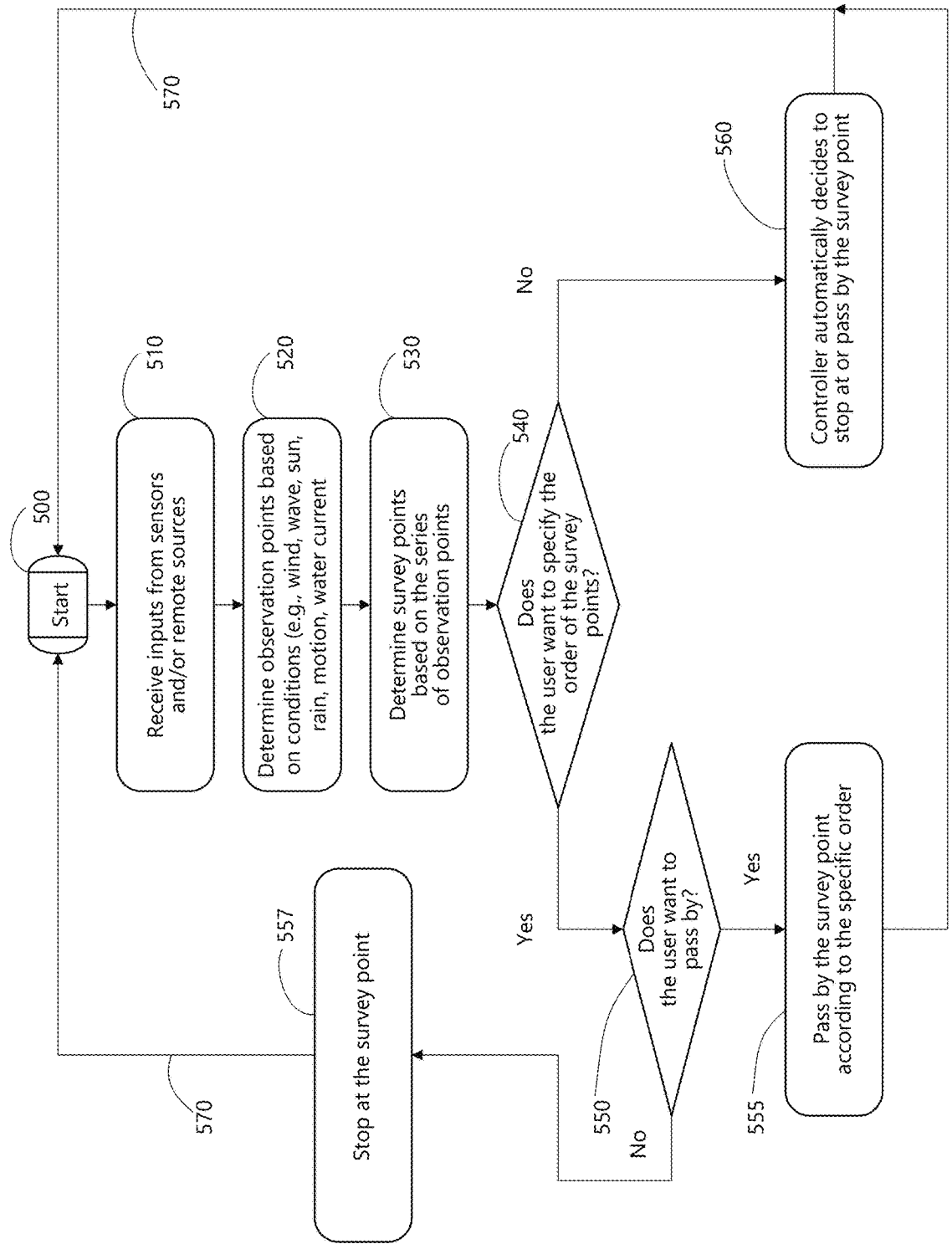
FIG. 5 illustrates a flow chart showing an example of a survey grid for the vessel to stop at or pass by a series of observation points based on a routing optimization method.

FIG. 5 illustrates a survey grid for the vessel to stop at or pass by a series of observation points based on the routing optimization method. In any of the navigation optimization embodiments, not all of the method steps shown in FIG. 5 are necessarily performed and that the order in which the steps are to be performed may be different in other embodiments. In some embodiments, the navigation optimization tool 500 receives inputs from sensors and/or remote sources 510. The tool then determines a series of observation points based on conditions 520 (e.g., wind, wave, sun, rain motion, water current). The tool may determine survey points based on the series of observation points 530 and request to a user to specify the order of the survey points 540 that the vessel may bypass or stop at. If the user specifies the order of the survey points, the vessel will be programmed to follow the specified instructions 550, whether that be passing by 550 the survey point or stopping at 557 the survey point. If the user does not specify the order of the survey points, the processor may automatically decide 560 to stop at or pass by the survey point. In any one of the embodiments, the aforementioned steps may be periodically updated 570.

Figure 6:
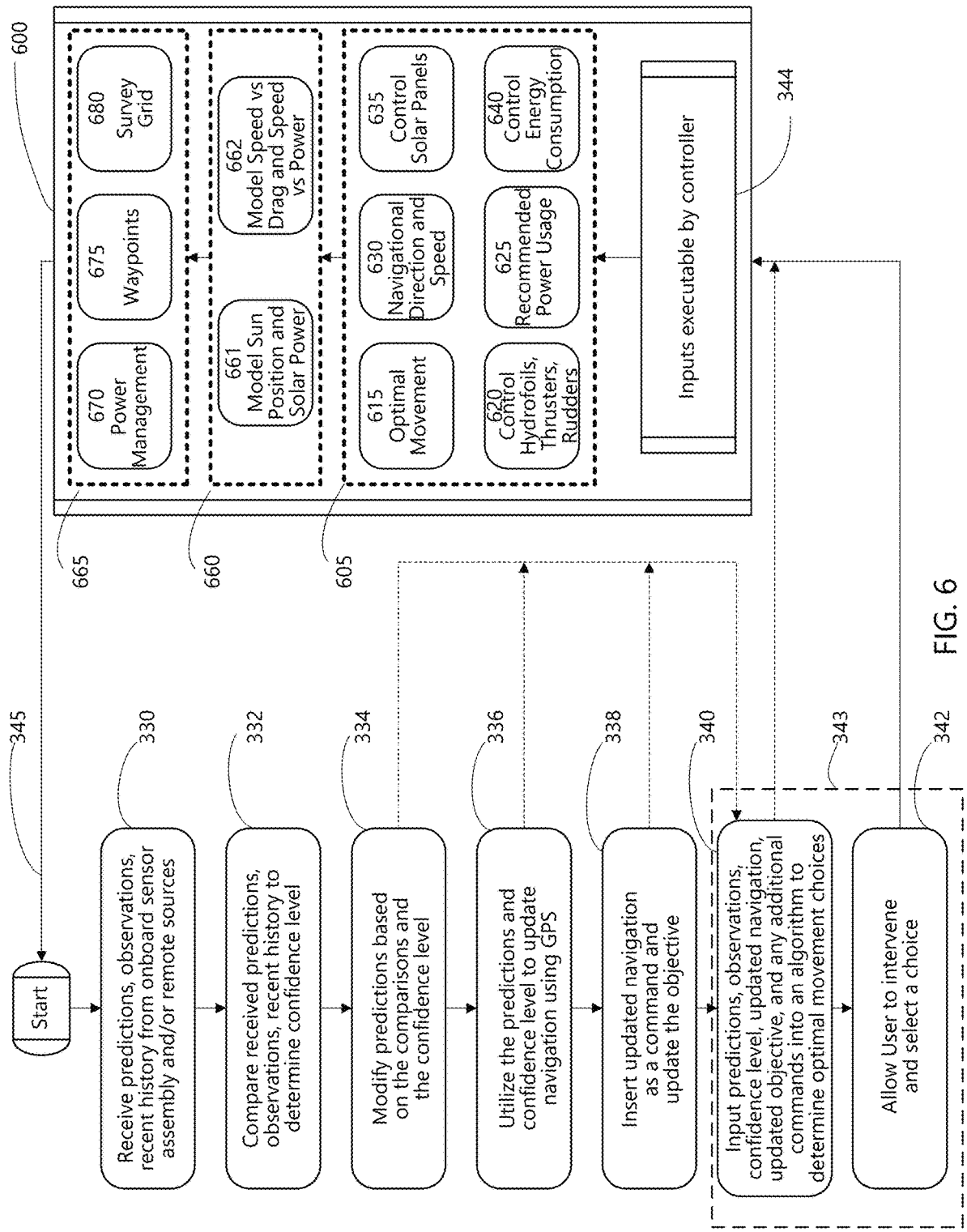
FIG. 6 illustrates an embodiment of a configurable controller that provides an output based on inputs to manage components of the autonomous vessel and execute optimization algorithms.

FIG. 6 illustrates an embodiment of a configurable controller that provides an output based on inputs to manage components of the autonomous vessel and execute optimization algorithms. The controller 600 can receive predictions and observations as inputs (340, 344) for a decision-making method. The controller can further output an optimal movement 615. The controller 600 can cause the vessel to implement the optimal movement. In some embodiments, the predictions can be wind, waves, sun, cloud, and current predictions 330. In other embodiments, the observations can be wind, waves, sun, rain, motion, and current observations 330. Observations and predictions 330 can be based on output from sensors, information from satellites, online resources, databases, and algorithms. Observations and predictions 330 can also pertain to the current location of the vessel and include models of the sun position, solar power, and the models of speed compared to drag and power. Observations and predictions can further pertain to potential future locations of the vessel. In some embodiments, the controller 600 can determine a navigational direction for the vessel to move 630. In other embodiments, the controller 600 can determine a recommended power usage 625.

In some embodiments, the controller can receive an output from the computer 224 and control the hydrofoils, thrusters, and rudders 620. The controller 600 can control the hydrofoils, thrusters, and rudders to right the vessel after capsizing. The controller 600 can also move the vessel toward a single waypoint 675. The controller 600 can move the vessel toward a path of waypoints. The controller 600 can cause the vessel to move toward the objective as quickly as possible. The controller 600 can cause the vessel to move toward the objective in a manner that conserves energy 670. The controller 600 can cause the vessel to move toward the objective in a manner that allows the solar panels to be optimally exposed to the sun 635. The controller 600 can cause the vessel to move at a speed that balances higher speed with lower drag 630. The controller 600 can also cause the vessel to move at a speed that balances higher speed with lower power usage (625, 640, 670).

In performing the processes and subprocesses illustrated in FIG. 6 (as well as the other figures), the controller 600 can determine waypoints, navigation, predictions for travel, and operational parameters based on information received from an outside source (for example, a satellite or shore-based communication) and/or from information provided by one or more sensors on the vehicle (for example, a sensor in the sensor assembly). For many operations of the vehicle (e.g., navigation, predictions on when the vehicle can reach a certain destination, etc.) the controller 600 can determine how far the vehicle can travel on a day by day, or hour by hour, basis. There are many factors that determine how far the vehicle may travel during any particular time period. For example, environmental conditions with respect to the desired direction of travel (e.g., wind speed, current, wave height, amount of sunlight) and vehicle conditions (e.g., operability of equipment, parameters of equipment on the vehicle (e.g., size and power of thrusters, number of thrusters), operability of solar panels (e.g., amount of power the one or more solar panels are producing), battery state, etc. In an example, the controller 600 determines navigational plans and movement of the vehicle based on available power from the one or more solar panels in the battery. Although in some configurations, the thrusters can be operated directly from power generated from a solar panel, typically the solar panel is used to charge the battery and the thrusters are powered from the battery in order to provide a stable power source. In many examples of vehicles of the type disclosed herein, during certain times the vehicle can be operated at a slow speed with the hull in the water with a relatively small drain on the battery. Such operations may be desired for times when solar power is not available (night, stormy weather) in order to keep the vehicle on track such that is not drifting in the ocean while maintaining the communication and other system on the vehicle and operational mode. As mentioned above, the controller 600 can cause the vessel to move at a speed that balances higher speed with lower drag 630 (when it is up on the hydrofoils), but even with the lower drag the thrusters are operated in a relatively high speed which uses a lot of power. To keep the vehicle and operational level, in some embodiments the controller uses a determined, or predetermined, minimum battery level in determining the speed of the vehicle. For example, a predetermined battery level may be 20% of power, which allows the vehicle to operate for a duration of time until power can again be supplied by the solar panels (e.g., night time). If the battery power is greater than 20%, the controller may provide power to the thruster(s) to move the vehicle at a speed such that it can rise up on the hydrofoils. If the battery power is less than 20%, the controller may provide a lower amount of power to the thruster(s) to keep the vehicle on station and operational, or to move it slowly along a navigational route and allow its systems to operate. In addition, in some embodiments the controller can determine which systems to have active based on the power level of the battery, putting certain systems in a sleep or power down mode to conserve power until solar power is again available. In various embodiments, the predetermined power level can be about 5%, 10%, 15%, 20%, 25%, 30%, 35%, 40%, 45%, 50%, plus or minus 5%. In some embodiments, for extra operational safety the predetermined power level is more than 50%. By monitoring the battery level and using the battery level to help determine operational actions, the controller can ensure that there is enough power for the vehicle to operate for sustained period of time, even if that means there may be extended periods of time when the vehicle is unable to use its hydrofoils. Also, by ensuring a minimum power level from the battery is available, the vehicle can perform procedures to right itself if it overturns, for example, during bad weather.

Figure 7A:
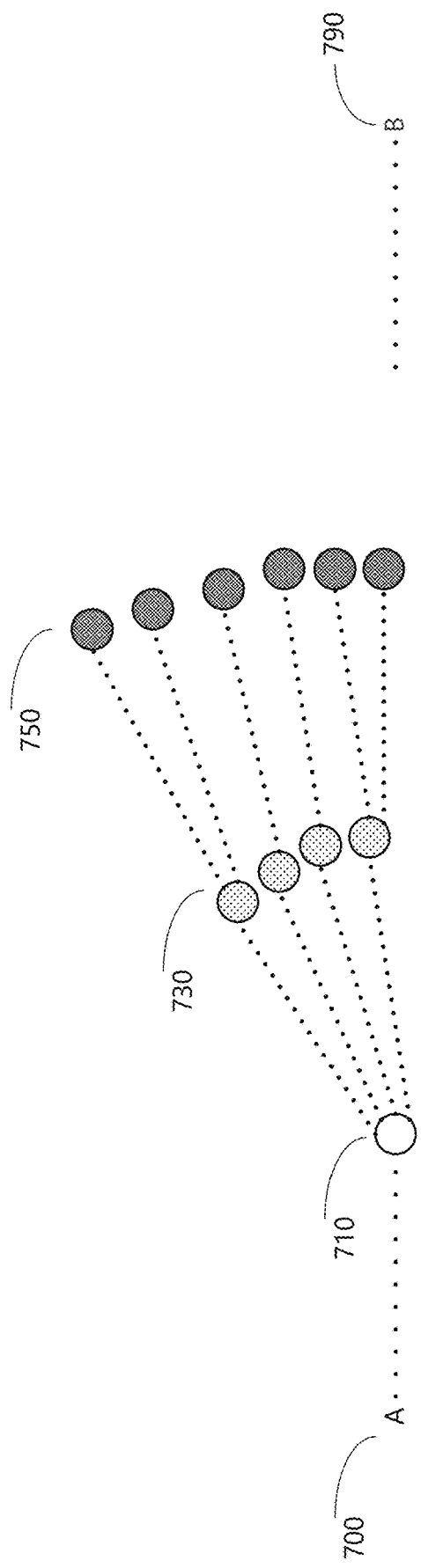
FIG. 7A illustrates an example of a look ahead testing algorithm to provide better spatial and temporal guidance regarding the navigation optimization process.

FIG. 7A illustrates the application of higher dimensional optimization including space, time, and power, to improve the probability of success of achieving the objective 790, namely by reaching a waypoint 710 in the minimum time or survey points on a schedule. Some embodiments include testing positions forward in space and time to look for favorable or unfavorable regions. The method can include determining the current and/or predicted conditions at a series of waypoints 730 and determining the optimal movement 750 toward an objective 790. The method can include analyzing the nearest waypoints to determine an optimal movement and can further include analyzing waypoints beyond the nearest waypoints to determine an optimal movement 750.

"Look ahead" is a type of backtracking algorithm (e.g., forward checking, arc consistency techniques) that attempts to foresee possible values branching or stemming from a test variable. The algorithm looks to choose a variable and evaluate future values related to the chosen variable. In some embodiments, the results of the look ahead testing are used to decide an optimal or next variable to evaluate and to provide a list of values to give to this optimal variable. The next variable that is chosen is one having a large number of values that is consistent with a current partial solution. In other embodiments, the next variable that is chosen is one having a minimum number of values that is consistent with the current partial solution. In any of the embodiments, the ordering of the values can be assigned to a variable in various methods (e.g., preferred values that remove the least total values from the set of unassigned variables, preferred values that produce a maximal number of solutions that are consistent with each other, and preferred values that produce a minimum number of solutions that are consistent with each other).

Figure 7B:
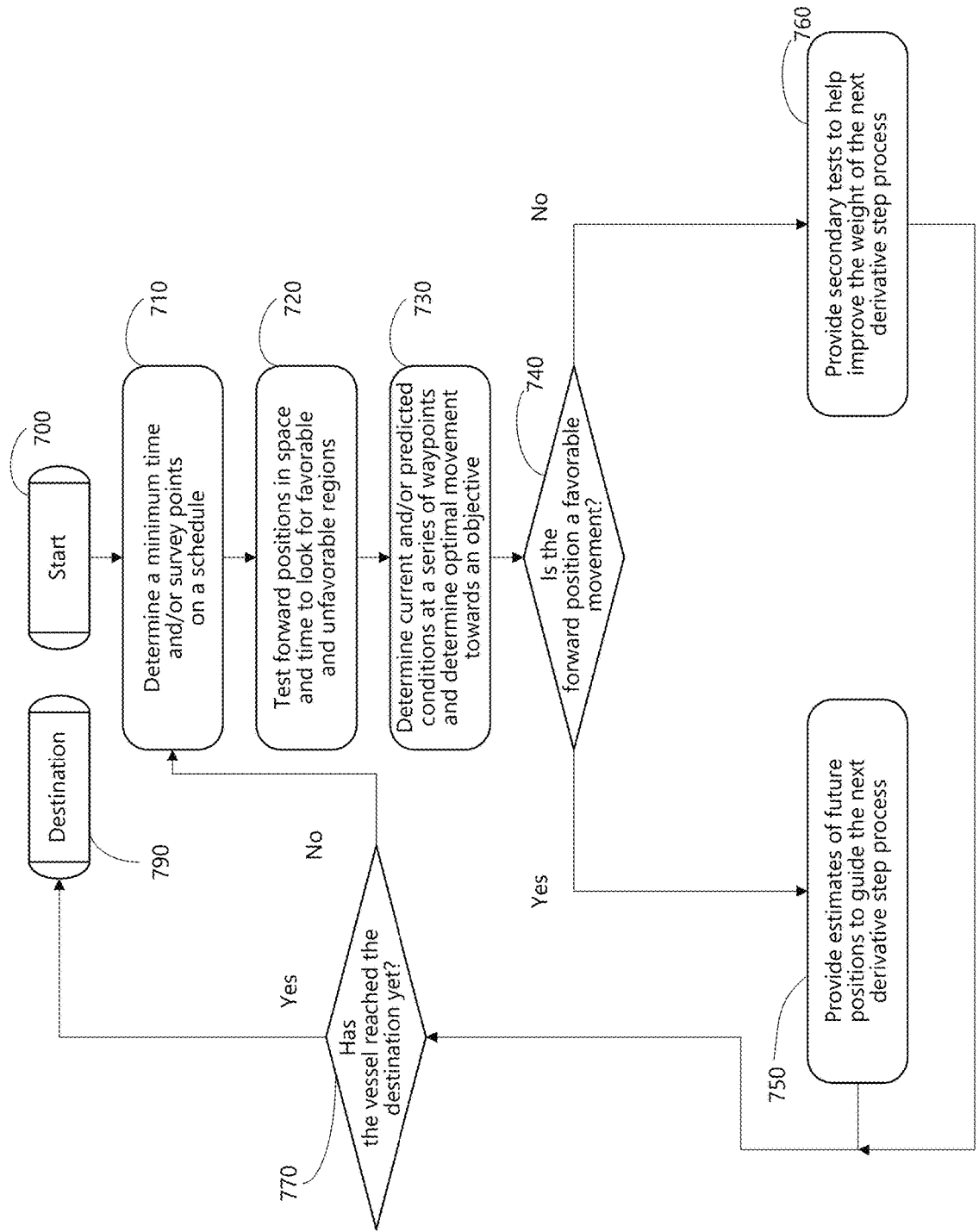
FIG. 7B illustrates a flow chart of a look ahead testing algorithm regarding the navigation optimization process.

FIG. 7B illustrates a flow chart applying the "look ahead" optimization method. In some embodiments, a vessel may be at a starting position 700. The vessel on route to its objective destination 790 may determine a minimum time and/or survey points on a schedule 710. The optimization method will then test forward positions in space and time to look for favorable and unfavorable regions 720. The method can then determine current and/or predicted conditions at a series of waypoints 730 and further determine whether the waypoint is a favorable movement 740. If the position is considered a favorable movement, the method will provide estimates of future positions to guide the next derivative step process 750. If the position is not a favorable movement, secondary tests 760 can be executed to help improve the weighting of the next derivative step process. This method can be re-iterated 770 or periodically applied until the vessel has reached its destination 790.

In some embodiments, derivatives for speed and efficiency of calculation and some look ahead capability (spatial and temporal) are employed to provide better guidance to the derivative step process. This can be an approach to solving the optimization problem, employing derivatives for speed and efficiency of calculation and some look ahead (spatial and temporal) capability to provide better guidance to the derivative step process. This look ahead approach can involve testing positions forward in space and time to look for favorable or unfavorable regions. The forward step can be based on estimates of future positions in space and time. Secondary tests can be used to weight the derivate test steps to reach a decision for the next big step.

Figure 8A:
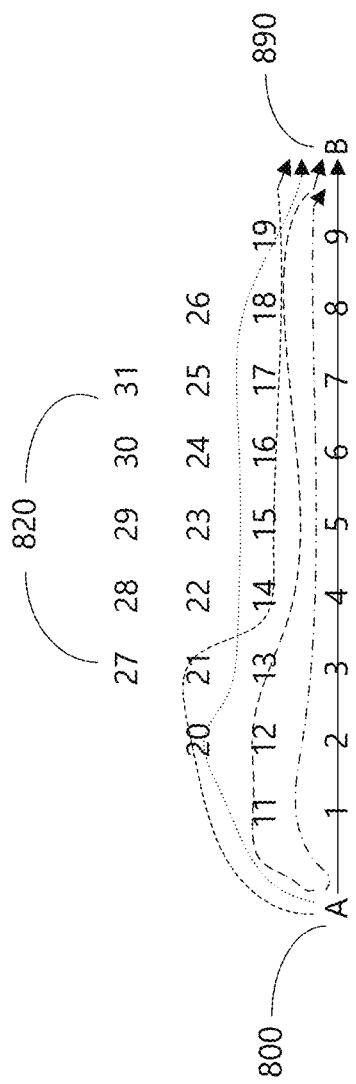
FIG. 8A illustrates a brute force algorithm, a minimally optimized method of calculating the five dimensions of data for all possible combinations of the nine points between A and B.

FIG. 8A illustrates an array of virtual waypoints 820 between two points-A 800 and B 890. Some embodiments can account for a confidence level associated with predictions to optimize navigation. In some embodiments, the array of virtual waypoints 820 can have sufficient spatial and temporal resolution to capture the changing time of day, day of month, wind, wave, and current environments.

A fundamental problem for an autonomous energy harvesting vessel is to provide instructions on how to achieve an objective, whether it be to reach a destination as quickly as possible, or to reach a destination by a deadline, or to traverse multiple destinations in a certain timeframe. Because of the power limitations imposed by nature and the solar and battery system, it is not necessarily straightforward to simply go directly to a waypoint at maximum speed, since the vessel's speed and distance may be affected by wind resistance and wave currents. Thus, the ocean conditions may cause the vessel to run out of power before achieving its destination, or alternately, force the vessel to travel more slowly than necessary. In any of the navigation optimization embodiments, a brute force algorithm may be used to address the above challenges by calculating the total distance for every possible route and for the algorithm to select the shortest route.

Figure 8B:
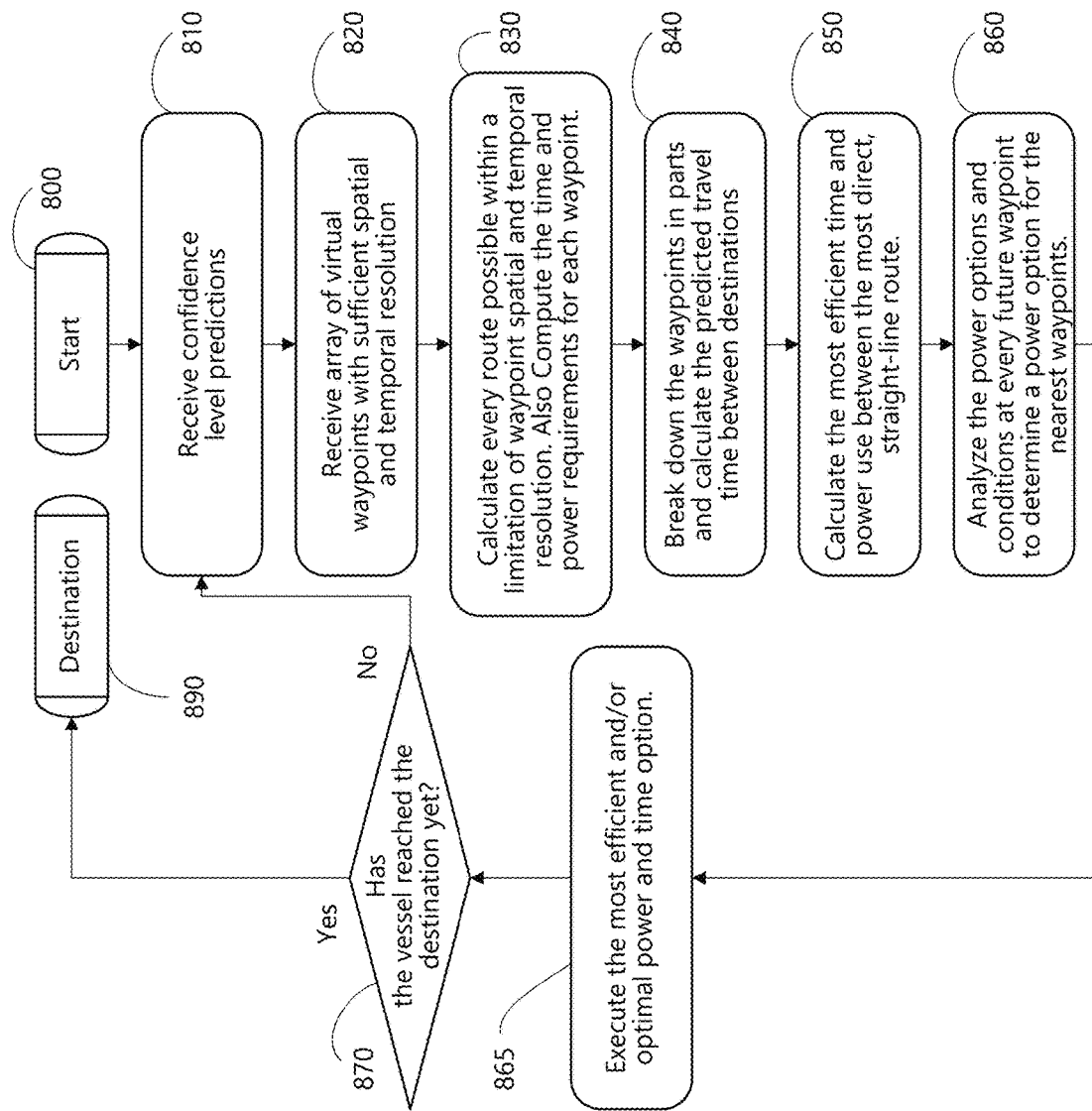
FIG. 8B illustrates a flow chart of a navigation optimization process utilizing an application of a brute force algorithm.

FIG. 8B illustrates a flow chart of a brute force algorithm, a minimally optimized method of calculating the five dimensions of data for all possible combinations of the nine points between A and B. One embodiment of the autonomous optimized navigation system may have a vessel at a starting point 800. The optimized navigation system may receive confidence level predictions 810 and further receive an array of virtual waypoints 820 with sufficient spatial and temporal resolution. The method may utilize an exhaustive method of calculating every route possible 830 within a limitation of waypoint spatial and temporal resolution and compute the time and power requirements for each waypoint 830. In some embodiments, the calculations of a vessel's trip with several days may be broken down into smaller collections of waypoints for each day. In those embodiments, the travel distance and speed can be used to determine a predicted travel time between points A 800 and B 890.

In some embodiments such as the one in FIG. 8A, calculating the most efficient time and power use between the most direct, straight-line route (1-9) can take 5 calculations for each waypoint 840. Some embodiments such as the one in FIG. 8B can include calculations for each power option of the vessel 850. The vessel can include five different power options. Some embodiments can include analyzing conditions at every future waypoint to determine a power option for the nearest waypoints 860. In those embodiments, calculating for each possible waypoint outside of the straight-line waypoint can be difficult for efficient processing and decision making. In other embodiments, the waypoints can be limited to a certain distance per day, or limited in lateral movements that consume more time than is allowed. Once the power option with the most efficient method is selected, the computer 224, controller 600, or other remote sources may execute the optimal method. In any of the embodiments, these steps may be periodically updated 870.

In some embodiments, since certain weather models can predict about 7 days in advance with reliability, the predictions can be limited to less than 7 days in the future. In any one of the embodiments, every route possible can be calculated within the set limitations of waypoints.

Figure 9A:
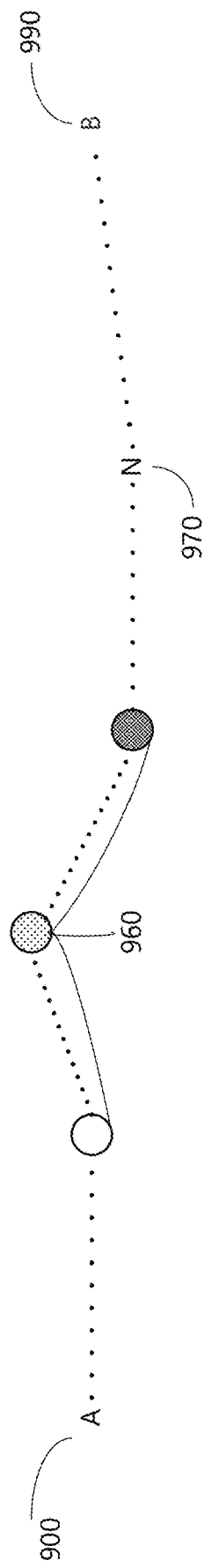
FIG. 9A illustrates a derivative or best slope navigation optimization method to determine favorable or unfavorable next steps.

FIG. 9A illustrates the derivative or best slope method. In some embodiments, small trial steps are taken from a start point 900 to waypoints 960 in different directions and speeds. A big trial step can be taken toward a new point in space and time in the most promising direction and at the most promising speed. Waypoints closer to the objective can be weighted to promote movement toward the objective 990. In such embodiments, this can be repeated 970 until the objective 990 is reached. The derivative method can also be used in classic minim/maxima optimization. The shape of the derivative functions can evolve with each step since time has moved forward to a new operating point. In some embodiments, the derivative method does not look forward past the immediate step. In other embodiments, the derivative method can include large deviations or backtracks to evade undesirable conditions.

Figure 9B:
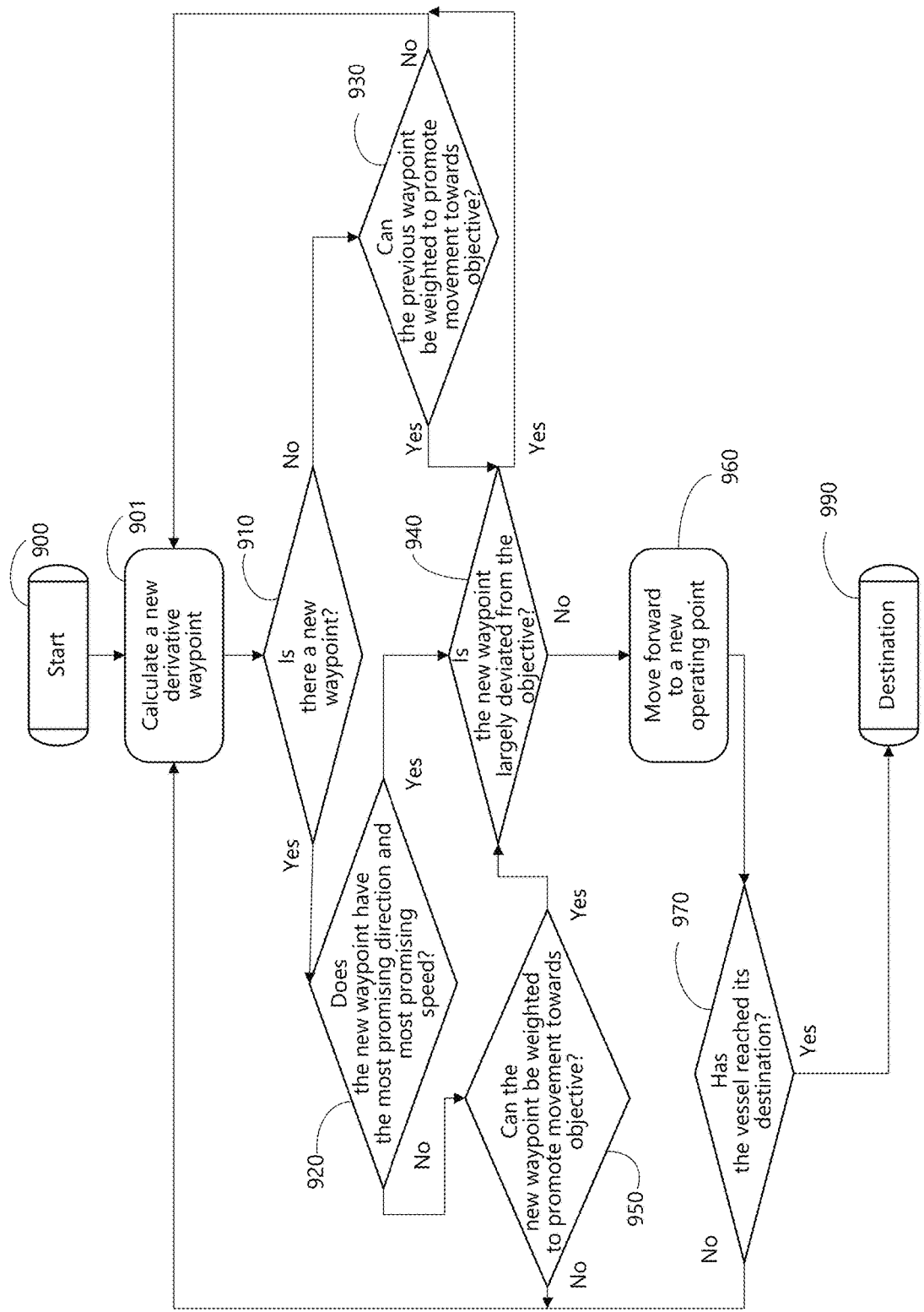
FIG. 9B illustrates a flow chart of the derivative or best slope algorithm process.
Figure 10:
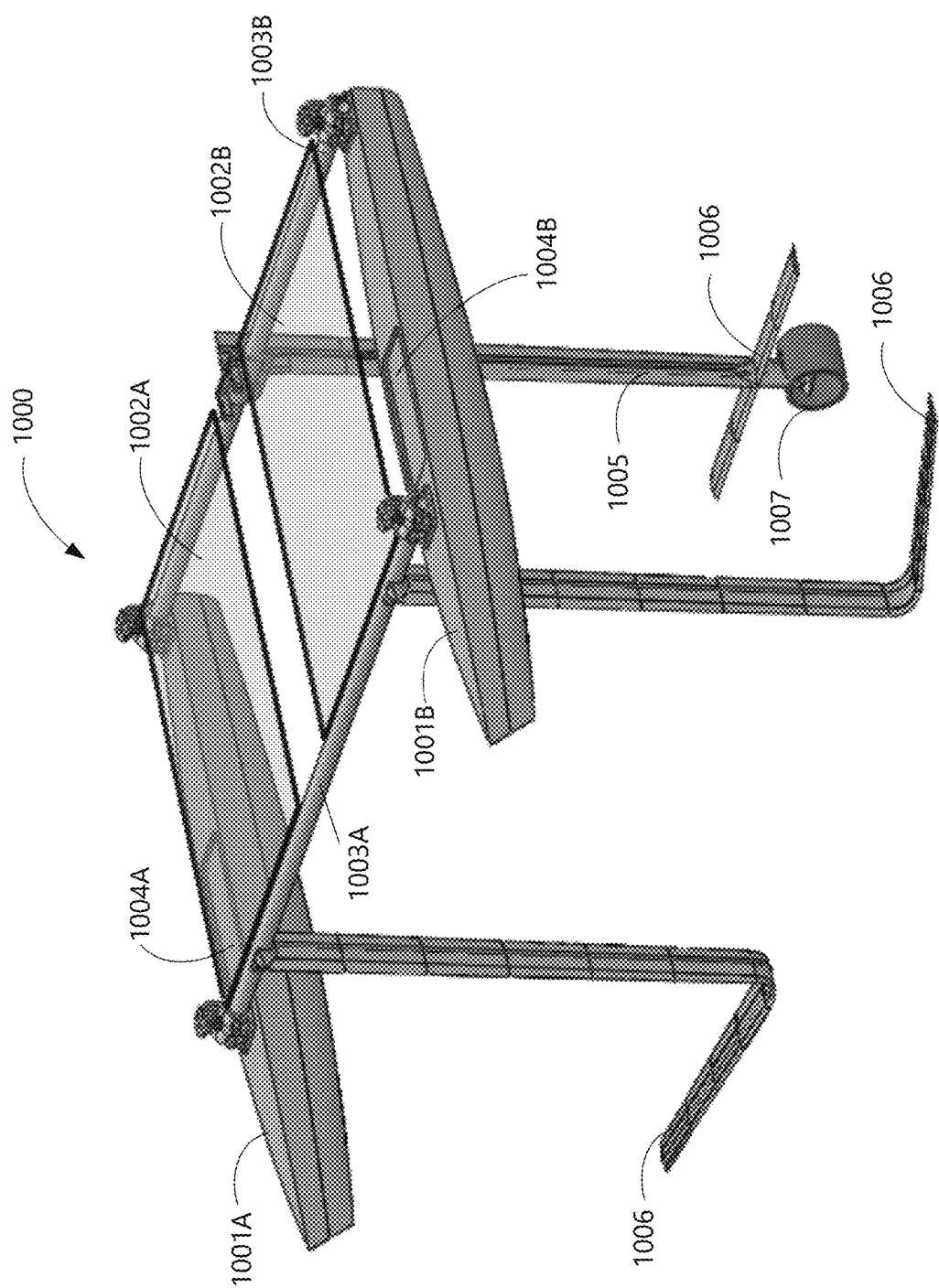
FIG. 10 illustrates a perspective view of an example embodiment of a vessel that incorporates features of this disclosure.

FIG. 9B illustrates a flow chart of the derivative or best slope method. In some embodiments, a vessel is at a starting point 900 and its optimization navigation starts calculating a new derivative waypoint 901. Once a new waypoint is determined 910 and the new waypoint has the most promising direction and promising speed from a series of determined waypoints 920, the vessel can move forward to the new operating point 960. In another embodiment, if the new waypoint is largely deviated from the objective 940 and/or the new waypoint cannot be weighted to promote movement of the vessel towards the objective 950, a new derivative waypoint can be calculated 910. In some embodiments, a previous waypoint 930 may be used to help weight and promote movement of the vessel toward its objective 990. Any of the derivative methods can be repeated 970 until the vessel has reached its destination 990. The derivative method can be used to calculate a first favorable movement from the start position, a series of next favorable movements, and/or a last favorable movement to an end position. Each favorable movement can be toward a virtual waypoint or a point between virtual waypoints.

An embodiment of exemplary vessel 1000 is illustrated in FIGS. 10-13 in accordance with one or more embodiments of autonomous unmanned vessels described herein. Other embodiments can have additional components, fewer components, or different components. The vessel in FIG. 10 comprises a pair of hulls 1001A, 1001B spaced apart and providing the primary buoyancy for vessel 1000. Each hull 1001A, 1001B can have control components (for example, a computer, a controller, and/or a sensor assembly) 1004A, 1004B mounted on or in the hulls The hulls 1001A, 1001B are interconnected by a pair of stabilizing beams 1003A, 1003B, which are perpendicular to the hulls and affixed to their top surfaces. The vessel 1000 further comprises a pair of rectangular solar panels 1002A, 1002B, positioned horizontally on the upper exterior portion of the vessel. The vessel also comprises a rudder 1005 extending perpendicularly downward from the stabilizing beams 1003A, 1003B. Two L-shaped front hydrofoils 1006 are attached to the underside of the front stabilizing beam 1003A, while a rear rudder 1005 is attached to the rear stabilizing beam 1003B. A hydrofoil 1006 is located toward the distal end of the rudder 1005. A tunnel bow thruster 1007, affixed at the distal end of the rear rudder 1005C, is also attached to the hydrofoil 1006, providing propulsion to the vessel.

Figure 11:
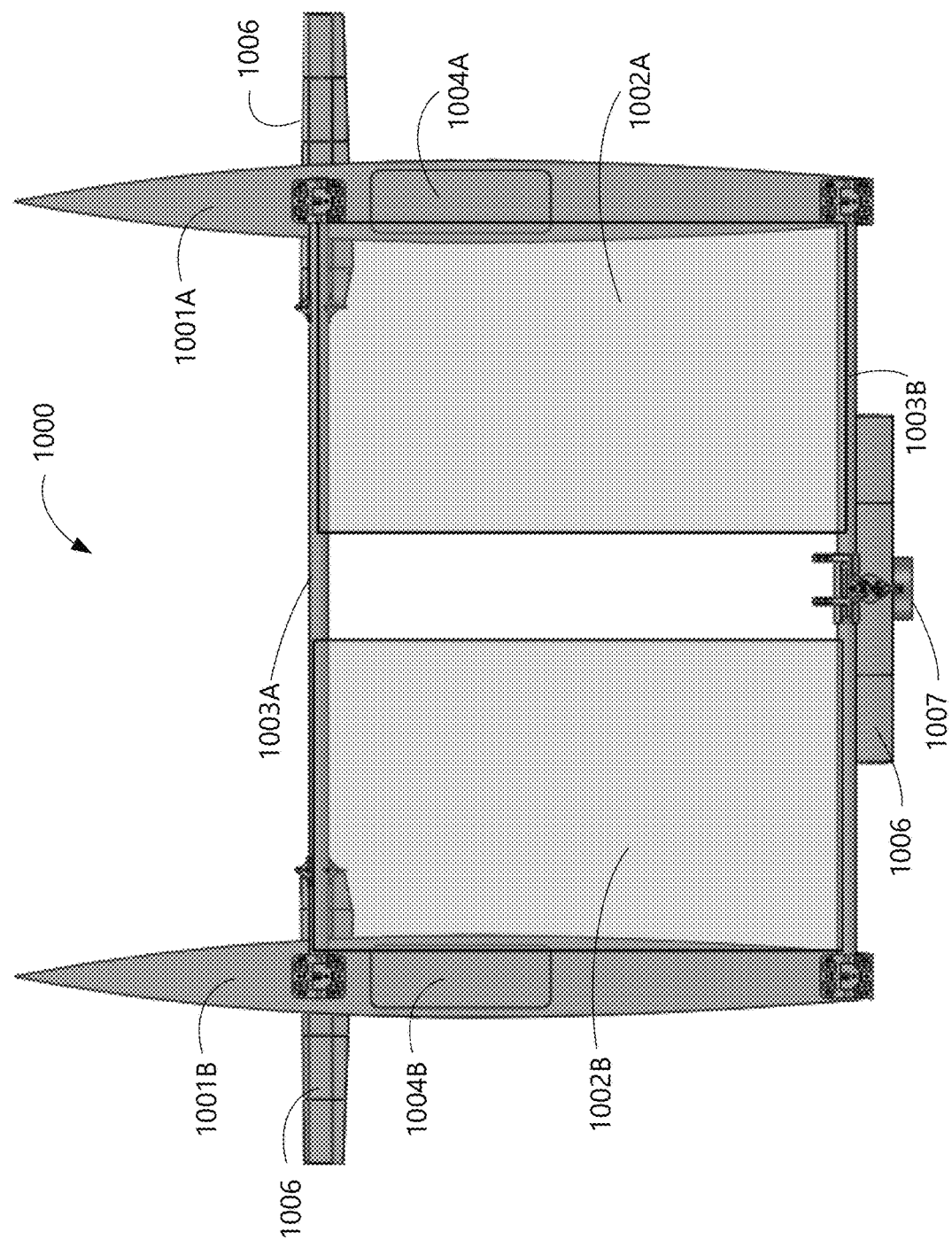
FIG. 11 illustrates a top view of the vessel of FIG. 10.

FIG. 11 illustrates a top view of vessel 1000 in accordance with one or more embodiments of autonomous unmanned vessels described herein, depicting the pair of the hulls 1001A, 1001B, solar panels 1002A, 1002B, and stabilizing beams 1003A, 1003B. In FIG. 11, the vessel comprises two narrow, elongated hulls 1001A, 1001B for efficient water navigation. Solar panels 1002A, 1002B are horizontally positioned near top surfaces of the hulls 1000A, 1000B.

Figure 12:
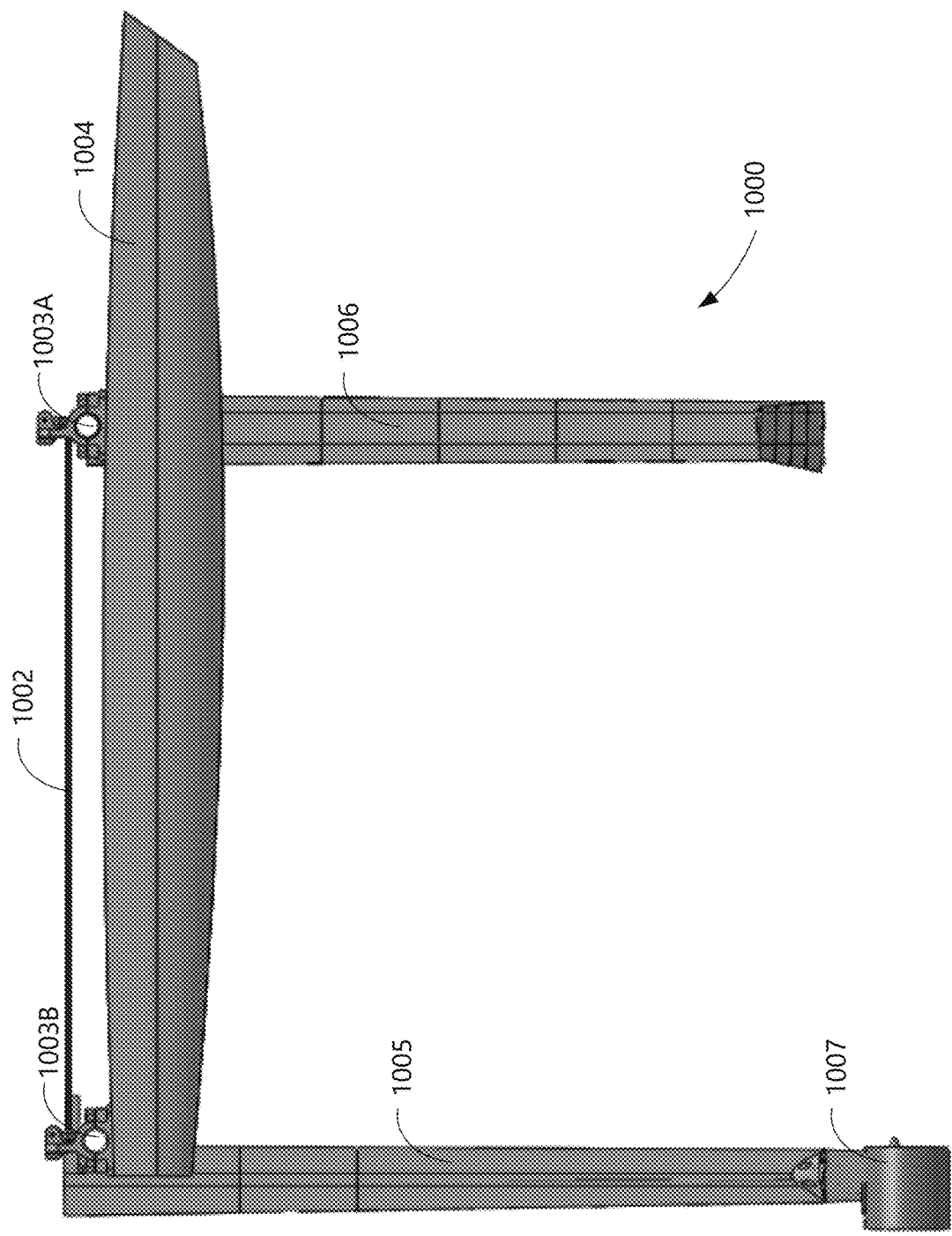
FIG. 12 illustrates a side view of the vessel of FIG. 10.

FIG. 12 illustrates a side view of vessel 1000 in accordance with one or more embodiments of autonomous unmanned vessels described herein, showing key structural components and their spatial relationship. In FIG. 12, the hulls 1004 are situation horizontally, with solar panels 1002 mounted on its upper surface. Two stabilizing beams 1003A, 1003B are attached perpendicularly to the top of the hulls 1004.

Figure 13:
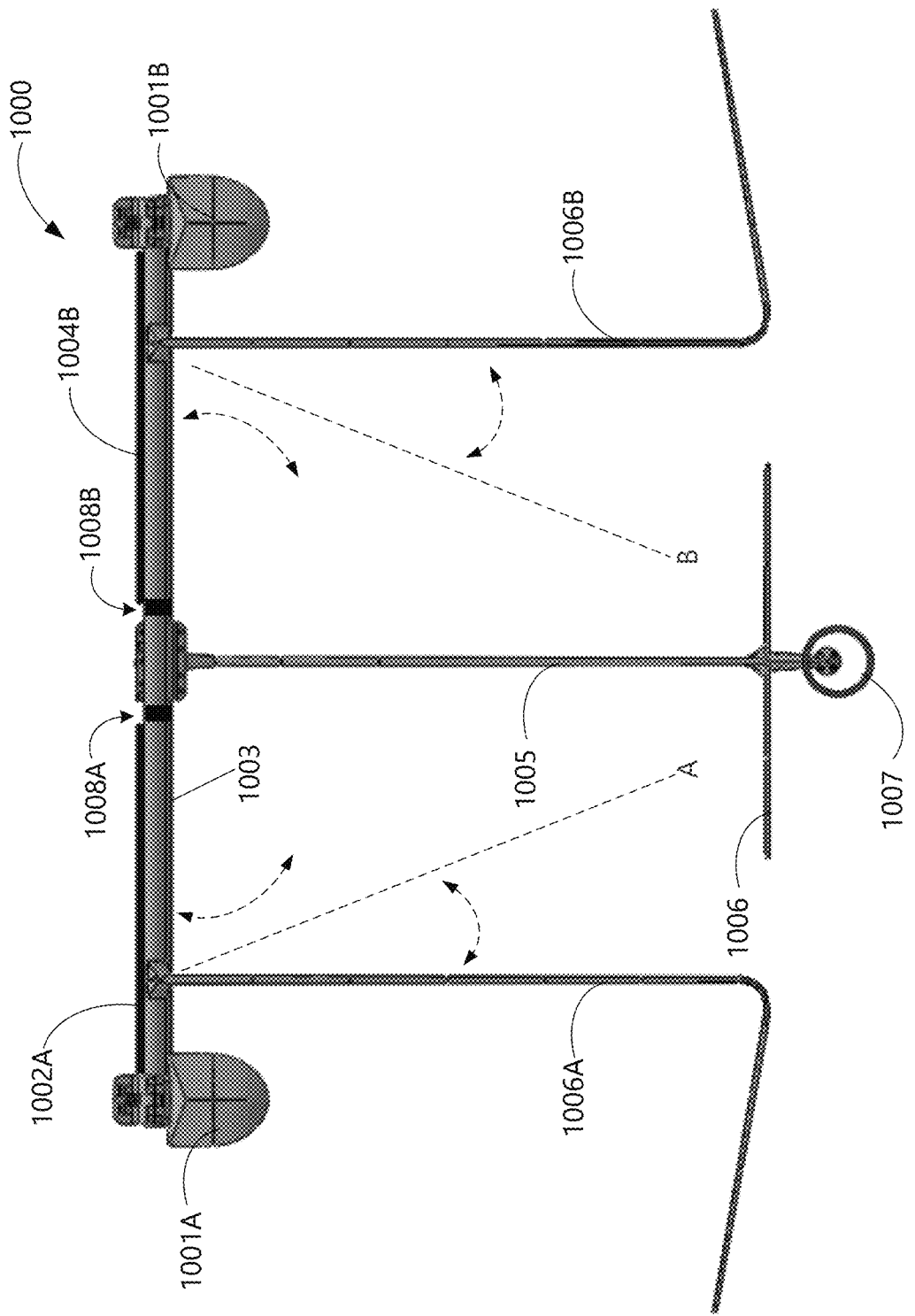
FIG. 13 illustrates a rear view of the vessel of FIG. 10.

FIG. 13 shows a front view of vessel 1000 in accordance with one or more embodiments of autonomous unmanned vessels described herein. In FIG. 13, hulls 1005A, 1005B, aligned parallel to each other, are shown to have curved lower portions. Stabilizing beams span between the hulls 1005A, 1005B, connecting them perpendicularly. Two L-shaped hydrofoils 1005A, 1005B extend outward from the front stabilizing beam 1003A. At the rear, a single straight rudder 1005C extends vertically downward, with a hydrofoil 1006 at its distal end. A thruster 1007 is further mounted on the hydrofoil 1006. In some embodiments, the vehicle includes one or more hinges 1008A, 1008B that allow a portion of the supporting beam 1003 and the hydrofoils 1006A and 1006B to swing inward towards the center of the vehicle such that are positioned near dashed lines A and B, respectively. In various embodiments, the hinges are positioned along the supporting beam 1003. For example, in a location not covered by a solar panel (e.g., as illustrated) to allow a portion of the supporting beam and the attached solar panel to swing inward in a "storage" or "transport" configuration. In some embodiments, the hinges can be locked in a deployed (for storage) or a undeployed (for vehicle operations) position. In some embodiments, hinges are included on the vertical portion of the hydrofoil 1006 to allow the hydrofoils to swing inward toward the center of the vehicle, e.g., towards dashed lines A and B. In some embodiments of the vehicle with such hinges, the vehicle is configured such that if it is lifted by a portion of the vehicle at the hulls 1001A, 1001B, the hydrofoils swing outward to a deployed position. That is, cross beams can be hinged so that the hulls can swing downward and inward. The hinge mechanism incorporates a locking/unlocking mechanism that is activated by the lifting lines to put the vessel into either an operational or storage mode.

Implementation Consideration

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosed devices, systems, and methods should not be taken to imply that the terminology is being re-defined herein to be restricted to including any specific characteristics of the features or aspects of the technology with which that terminology is associated.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

It will also be understood that, when a feature or element (for example, a structural feature or element) is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present. Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. An unmanned vehicle for operating on a surface of a body of water, the vehicle comprising:

a hull;

a solar array comprising at least one solar panel electrically coupled to a battery;

a plurality of hydrofoils coupled to the hull, the plurality of hydrofoils configured to lift the hull out of the water when the vehicle is propelled through the water;

one or more hinges positioned on the vehicle to allow the plurality of hydrofoils to be folded inward towards a center of the vehicle to substantially collapse the vehicle;

a rudder;

one or more electric thrusters electrically coupled to the battery;

a sensor assembly;

a satellite link; and a controller assembly configured to:
 receive information from the sensor assembly and the satellite link including information indicating a travel time and a power usage,
 determine a route having a plurality of waypoints between a starting position and a destination to move the vehicle from the starting position to the destination using information received from the satellite link,
 calculate the travel time from the starting position and the at least one of the plurality of waypoints,
 calculate the power usage from the starting position to at least one of the plurality of waypoints, and
 determine, based at least in part on the travel time and the power usage calculated, at least one duration of time to control the one or more electric thrusters and the rudder to move the vehicle along the route to the destination, wherein controlling the one or more electric thrusters includes providing power to the electric thruster, based at least in part on the information indicating the travel time and the power usage, to propel the vehicle at a speed such that the plurality of hydrofoils lifts the hull out of the water as the vehicle moves along the route for at least part of the route.

2. The unmanned vehicle of claim 1, wherein the sensor assembly includes a pressure sensor configured to generate a signal indicative of the speed of the vehicle based on water moving past the pressure sensor.

3. The unmanned vehicle of claim 2, wherein the pressure sensor is coupled to one of the plurality of hydrofoils.

4. The unmanned vehicle of claim 2, wherein the sensor assembly comprises:

a light detection system configured to analyze the water ahead of the vehicle, and an ultrasonic imaging system configured to measure height of the hull above the water and detect oncoming waves, wherein the controller assembly is further configured to receive information from the pressure sensor, the light detection system, and the ultrasonic imaging system, and to control the one or more electric thrusters and rudder based at least in part on the information from the pressure sensor, the light detection system, and the ultrasonic imaging system.

5. The unmanned vehicle of claim 1, wherein at least one of the one or more electric thrusters is coupled to the rudder.

6. The unmanned vehicle of claim 1, wherein at least one of the one or more electric thrusters is coupled to one of the plurality of hydrofoils.

7. The unmanned vehicle of claim 1, wherein the one or more electric thrusters includes two or more electric thrusters.

8. The unmanned vehicle of claim 1, wherein the solar array is shaped as an air foil.

9. The unmanned vehicle of claim 1, wherein at least one solar panel is movable, and wherein the controller assembly is further configured to move the at least one solar panel based on information received from the sensor assembly.

10. The unmanned vehicle of claim 1, wherein the sensor assembly includes an inertial measurement unit (IMU), and wherein the controller assembly is further configured to control the one or more electric thrusters and the rudder based on information received from the IMU.

11. A method for operation of an unmanned ocean vehicle for operating on a surface of a body of water, the method comprising:

providing an unmanned ocean vehicle comprising a hull, a plurality of hydrofoils, a solar panel, a battery electrically coupled to the solar panel, a rudder, one or more electric thrusters, a sensor assembly, one or more hinges positioned on the vehicle to allow the plurality of hydrofoils to be folded inward towards a center of the vehicle to substantially collapse the vehicle, a satellite link, and a controller assembly configured to control the rudder and one or more electric thrusters;

receiving information from the sensor assembly and the satellite link including information indicating a travel time and a power usage;

generating a route having a plurality of waypoints between a starting position and a destination to move the vehicle from the starting position to the destination using information received from the satellite link;

calculating the travel time from the starting position and the at least one of the plurality of waypoints;

calculating the power usage from the starting position to at least one of the plurality of waypoints; and determining, based at least in part on the travel time and the power usage calculated, at least one duration of time to control the rudder and the one or more electric thrusters to move the vehicle along the route to the destination, wherein controlling the rudder and the one or more electric thrusters includes providing power to the electric thruster, based at least in part on the information indicating the travel time and the power usage, to propel the vehicle at a speed such that the plurality of hydrofoils lift the hull of the vehicle out of the water as the vehicle moves along the route for at least part of the route.

12. The method of claim 11, wherein the controller assembly is configured to receive information related to a power level of the battery.

13. The method of claim 12, wherein the controller assembly operates the vehicle at a speed such that the plurality of hydrofoils lift the hull of the vehicle out of the water based at least in part on a power level of the battery determined by the controller assembly.

14. The method of claim 11, further comprising:

measuring, using a pressure sensor positioned on the plurality of hydrofoils, pressure of the water;

analyzing, using a light detection system, water in front of the vehicle;

measuring, using an ultrasonic imaging system, a height of the vehicle above the water;

receiving, by the controller assembly, information from the pressure sensor, the light detection system, and the ultrasonic imaging system; and controlling, by the controller assembly, the one or more electric thrusters based at least in part on the information from the pressure sensor, the light detection system, and the ultrasonic imaging system, wherein controlling the one or more electric thrusters includes controlling the one or more electric thrusters to propel the vehicle at a speed such that the plurality of hydrofoils lifts the hull out of the water.

15. The method of claim 14, further comprising detecting an oncoming wave using the ultrasonic imaging system, and controlling, by the controller assembly, the one or more electric thrusters and the rudder based at least in part on information from the ultrasonic imaging system of the oncoming wave.

16. A method for operation of an unmanned ocean vehicle for operating on a surface of a body of water, the method comprising:
    providing an unmanned ocean vehicle comprising a hull, a plurality of hydrofoils, a solar panel, a battery electrically coupled to the solar panel, a rudder, one or more electric thrusters, a sensor assembly, one or more hinges positioned on the vehicle to allow the plurality of hydrofoils to be folded inward towards a center of the vehicle to substantially collapse the vehicle, a satellite link, and a controller assembly configured to control the rudder and one or more electric thrusters;
    receiving information from the sensor assembly and the satellite link including information indicating a travel time and a power usage;
    generating a route having a plurality of waypoints between a starting position and a destination to move the vehicle from the starting position to the destination using information received from the satellite link;
    calculating the travel time from the starting position and the at least one of the plurality of waypoints;
    calculating the power usage from the starting position to at least one of the plurality of waypoints;
    determining, based at least in part on the travel time and the power usage calculated, at least one duration of time to control the rudder and the one or more electric thrusters to move the vehicle along the route to the destination, wherein controlling the rudder and the one or more electric thrusters includes providing power to the electric thruster, based at least in part on the information indicating the travel time and the power usage, to propel the vehicle at a speed such that the plurality of hydrofoils lift the hull of the vehicle out of the water as the vehicle moves along the route for at least part of the route;
    measuring, using a pressure sensor positioned on the plurality of hydrofoils, pressure of the water;
    analyzing, using a light detection system, water in front of the vehicle;
    measuring, using an ultrasonic imaging system, a height of the vehicle above the water;
    receiving, by the controller assembly, information from the pressure sensor, the light detection system, and the ultrasonic imaging system;
    controlling, by the controller assembly, the one or more electric thrusters based at least in part on the information from the pressure sensor, the light detection system, and the ultrasonic imaging system, wherein controlling the one or more electric thrusters includes controlling the one or more electric thrusters to propel the vehicle at a speed such that the plurality of hydrofoils lifts the hull out of the water;
    detecting an oncoming wave using the ultrasonic imaging system, and controlling, by the controller assembly, the one or more electric thrusters and the rudder based at least in part on information from the ultrasonic imaging system of the oncoming wave;
    determining, by the controller assembly using information from the pressure sensor, that the vehicle has capsized; and
    controlling, by the controller assembly, the rudder and the one or more electric thrusters to move the vehicle to an upright position.

17. The method of claim 12, wherein calculating a travel time from the starting position and the at least one of the plurality of waypoints is based in part on the power level of the battery.

18. The method of claim 12, wherein the controller assembly determines operations of the unmanned ocean vehicle based at least in part on the power level of the battery.

19. The method of claim 12, wherein the controller assembly determines operations of the unmanned ocean vehicle based at least in part on whether the power level of the battery is above a predetermined threshold.

20. The method of claim 12, wherein the controller assembly operates the vehicle at a speed such that the plurality of hydrofoils lift the hull of the vehicle out of the water based at least in part on a predetermined power level of the battery.

* * * * *